US012128328B2

(12) United States Patent
Baldassari et al.

(10) Patent No.: US 12,128,328 B2
(45) Date of Patent: Oct. 29, 2024

(54) MODULARLY CONFIGURABLE STAGING SYSTEM AND METHOD

(71) Applicants: Production Resource Group, L.L.C., Armonk, NY (US); MIKE-O-MATIC Industries LLC, Hoboken, NJ (US)

(72) Inventors: Michael J. Baldassari, Hoboken, NJ (US); Christopher D. Conti, Rutherford, NJ (US); James M. Lehner, III, Montville, NJ (US)

(73) Assignees: Production Resource Group, L.L.C., New Windsor, NY (US); MIKE-O-MATIC Industries LLC, Hoboken, NJ (US)

( * ) Notice: Subject to any disclaimer, the term of this patent is extended or adjusted under 35 U.S.C. 154(b) by 383 days.

(21) Appl. No.: 17/630,012

(22) PCT Filed: Jul. 31, 2020

(86) PCT No.: PCT/US2020/044548

§ 371 (c)(1),
(2) Date: Jan. 25, 2022

(87) PCT Pub. No.: WO2021/022182

PCT Pub. Date: Feb. 4, 2021

(65) Prior Publication Data

US 2022/0266163 A1 Aug. 25, 2022

Related U.S. Application Data

(60) Provisional application No. 62/881,224, filed on Jul. 31, 2019.

(51) Int. Cl.
*A63J 1/02* (2006.01)
*A63J 5/02* (2006.01)
(Continued)

(52) U.S. Cl.
CPC . *A63J 1/02* (2013.01); *A63J 5/02* (2013.01); *F21V 21/38* (2013.01); *F21W 2131/406* (2013.01)

(58) Field of Classification Search
CPC ................ A63J 1/02; A63J 5/02; F21V 21/38
(Continued)

(56) References Cited

U.S. PATENT DOCUMENTS 4,512,117 A 4/1985 Lange
4,837,665 A 6/1989 Hoyer et al.
(Continued)

FOREIGN PATENT DOCUMENTS

WO 8905421 A1 12/1988
WO 2019124501 A1 6/2019

OTHER PUBLICATIONS

Written Opinion and International Search Report dated Nov. 3, 2020, in connection with PCT/US2020/044548, filed Jul. 31, 2020.
(Continued)

*Primary Examiner* — Kien T Nguyen
(74) *Attorney, Agent, or Firm* — Downs Rachlin Martin PLLC

(57) ABSTRACT

A modular staging system and method includes an overhead hoist grid for lifting staging modules providing for a vast variety of combinations of the truss components for making many different kinds and shapes. This design is flexible,
(Continued)

scalable and can be reconfigured in an accelerated manner resulting is substantial cost savings for a production.

11 Claims, 26 Drawing Sheets

(51) Int. Cl.
*F21V 21/38* (2006.01)
*F21W 131/406* (2006.01)

(58) Field of Classification Search
USPC ........................................................ 472/75
See application file for complete search history.

(56) References Cited

U.S. PATENT DOCUMENTS

| | | | | |
|---|---|---|---|---|
| 4,862,336 | A | 8/1989 | Richardson et al. | |
| 5,237,792 | A | 8/1993 | Oberman et al. | |
| 5,278,742 | A | 1/1994 | Garrett | |
| 5,743,060 | A | 4/1998 | Hayes et al. | |
| 6,155,696 | A | 12/2000 | Winton et al. | |
| 8,099,913 | B1 * | 1/2012 | Dodd | A63J 1/02 52/79.5 |
| 9,382,714 | B2 | 7/2016 | Richardson | |
| 10,155,527 | B2 | 12/2018 | Hossler et al. | |
| 10,570,607 | B2 | 2/2020 | Stapleton et al. | |
| 2002/0092244 | A1 | 7/2002 | Santa Cruz et al. | |
| 2002/0149927 | A1 | 10/2002 | Westhofen | |
| 2009/0173033 | A1 | 7/2009 | Baxter, Jr. | |
| 2015/0285464 | A1 | 10/2015 | Finn | |
| 2016/0368744 | A1 * | 12/2016 | Hoffend, III | B66D 1/39 |
| 2019/0184303 | A1 * | 6/2019 | Leclercq | B66F 7/02 |

OTHER PUBLICATIONS https://www.germanlightproducts.com/product/impression-x4-xl-2/30.07.2020; GLP Impression X4XL Specifications; printed Jul. 30, 2020.
https://www.germanlightproducts.com/product/impression-x4-xl-2/30.07.2020; GLP Impression X4XL Description; printed Jul. 30, 2020.
https://www.germanlightproducts.com/product/impression-x4-bar-20/30.07.2020; GLP Impression X4 Bar Specifications; printed Jul. 30, 2020.
https://www.germanlightproducts.com/product/impression-x4-bar-20/30.07.2020; GLP Impression X4 Bar Description; printed Jul. 30, 2020.
Best Boy HP Spot Luminaire User Manual; Software Version 3.02; www.prg.com; Mar. 15, 2018.
Best Boy HP Luminaire Datasheet; Version Jan. 2019.
https://www.prg.com/technology/products/luminaires/best-boy-hp-spot; Best Boy HP Spot Luminaire; printed Jul. 30, 2020.
Magicpanel 602; User Manual V3.2; Ayrton Digital Lighting; Dec. 16, 2014.
Icon Edge data sheet; www.prg.com; printed Jul. 30, 2020.
Series 400 Power and Data Distribution System Datasheet; www.prg.com; Version Oct. 2012.
PRG Lighting Systems, Networking Guide Rev D; Version Feb. 26, 2017.
PRG Series 400 Power & Data Distribution System User Manual; Software Version 5.0; Version Sep. 30, 2015.

* cited by examiner

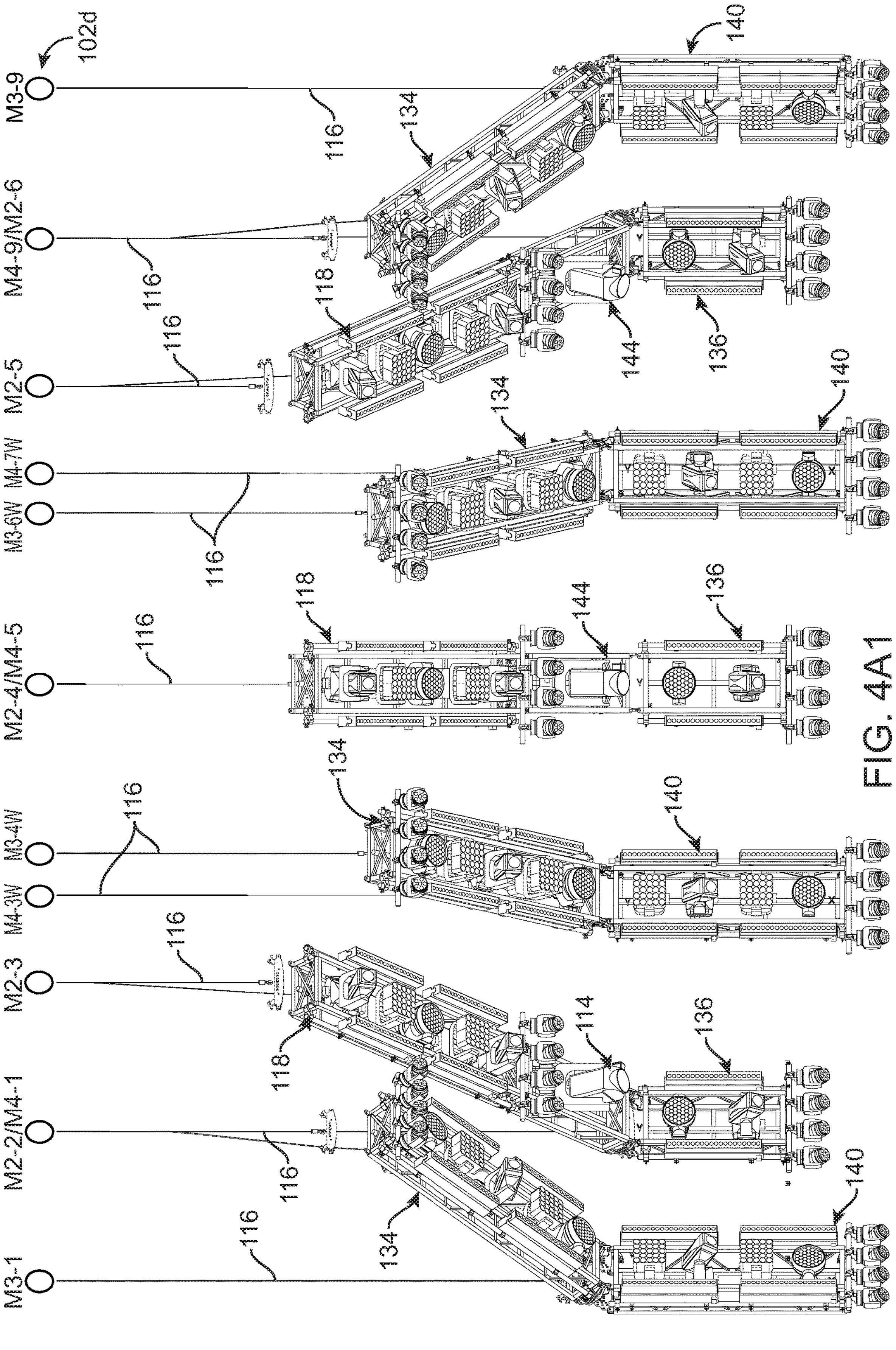
FIG. 4A1

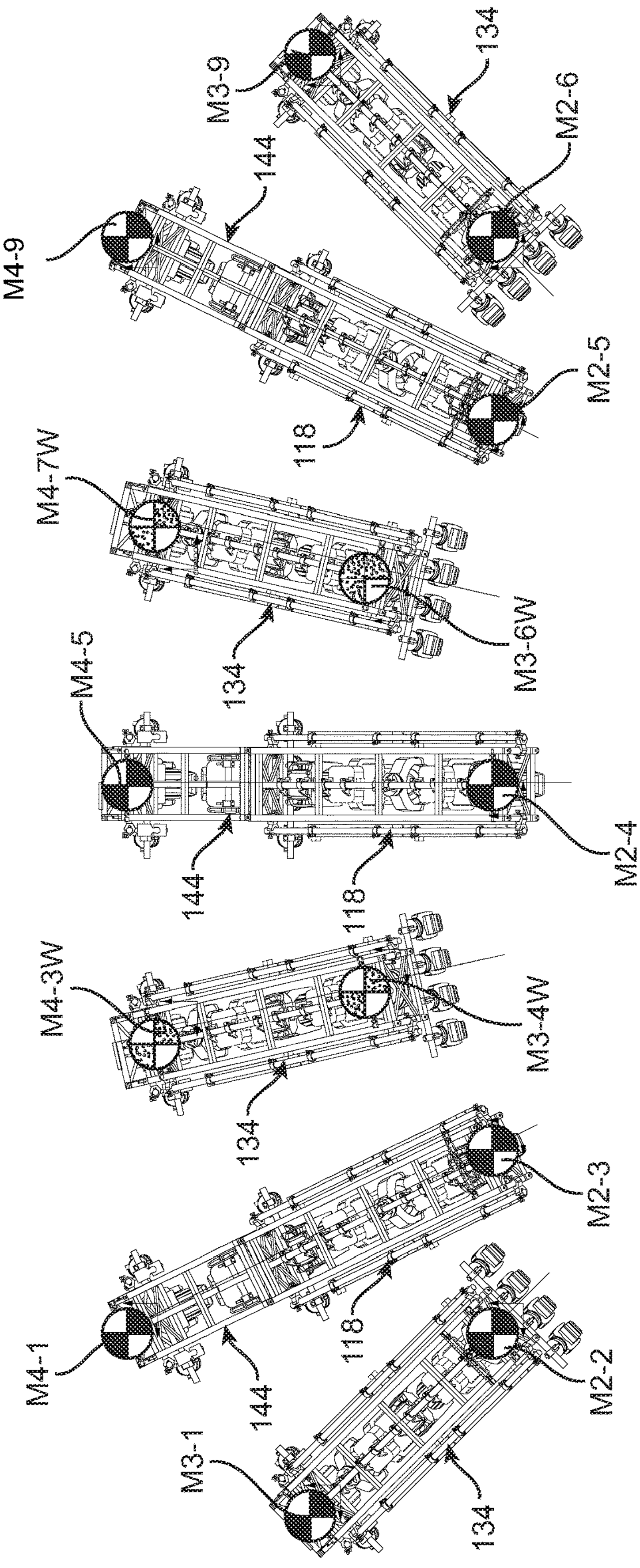
FIG. 4A2

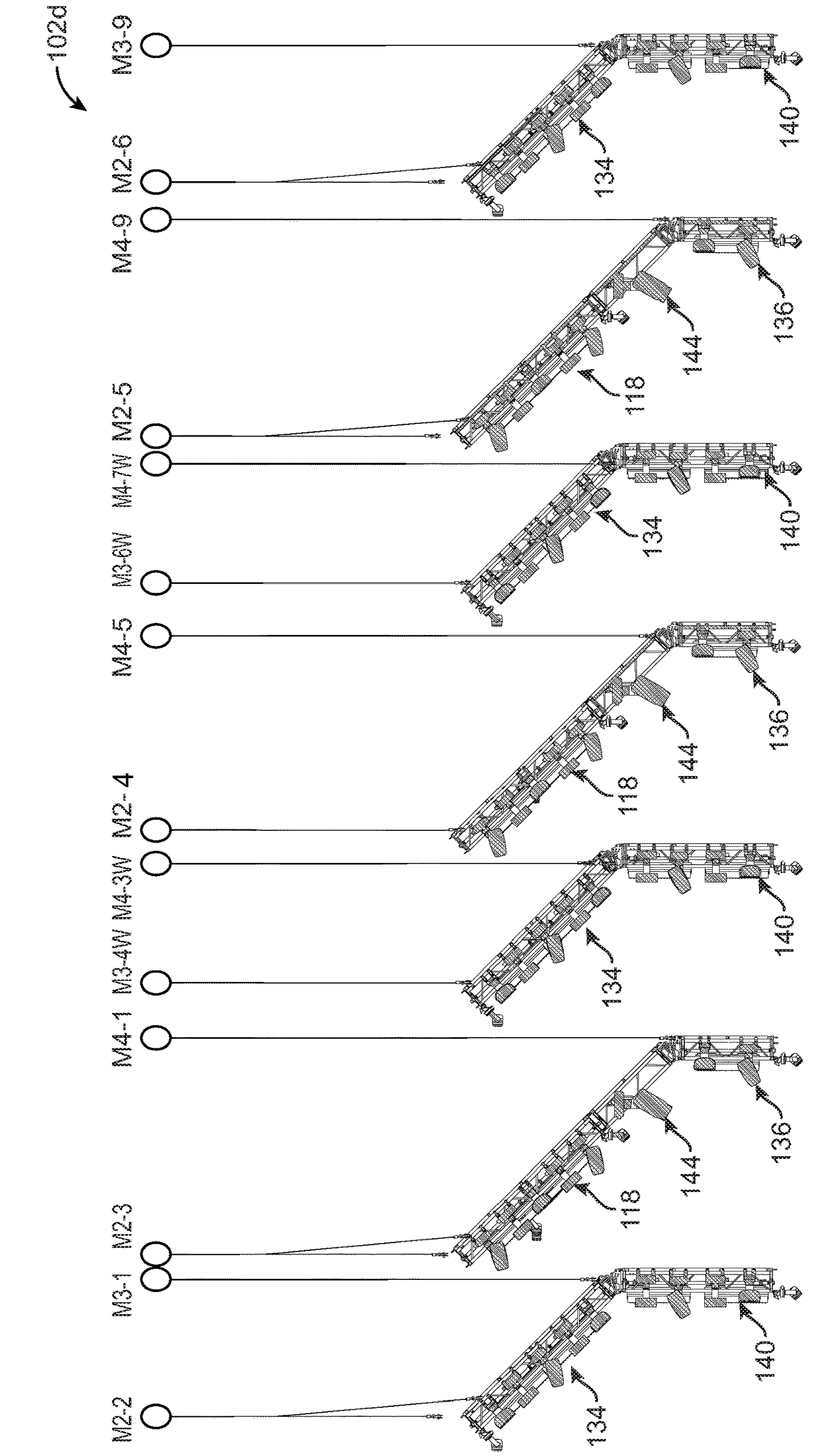
FIG. 4A3

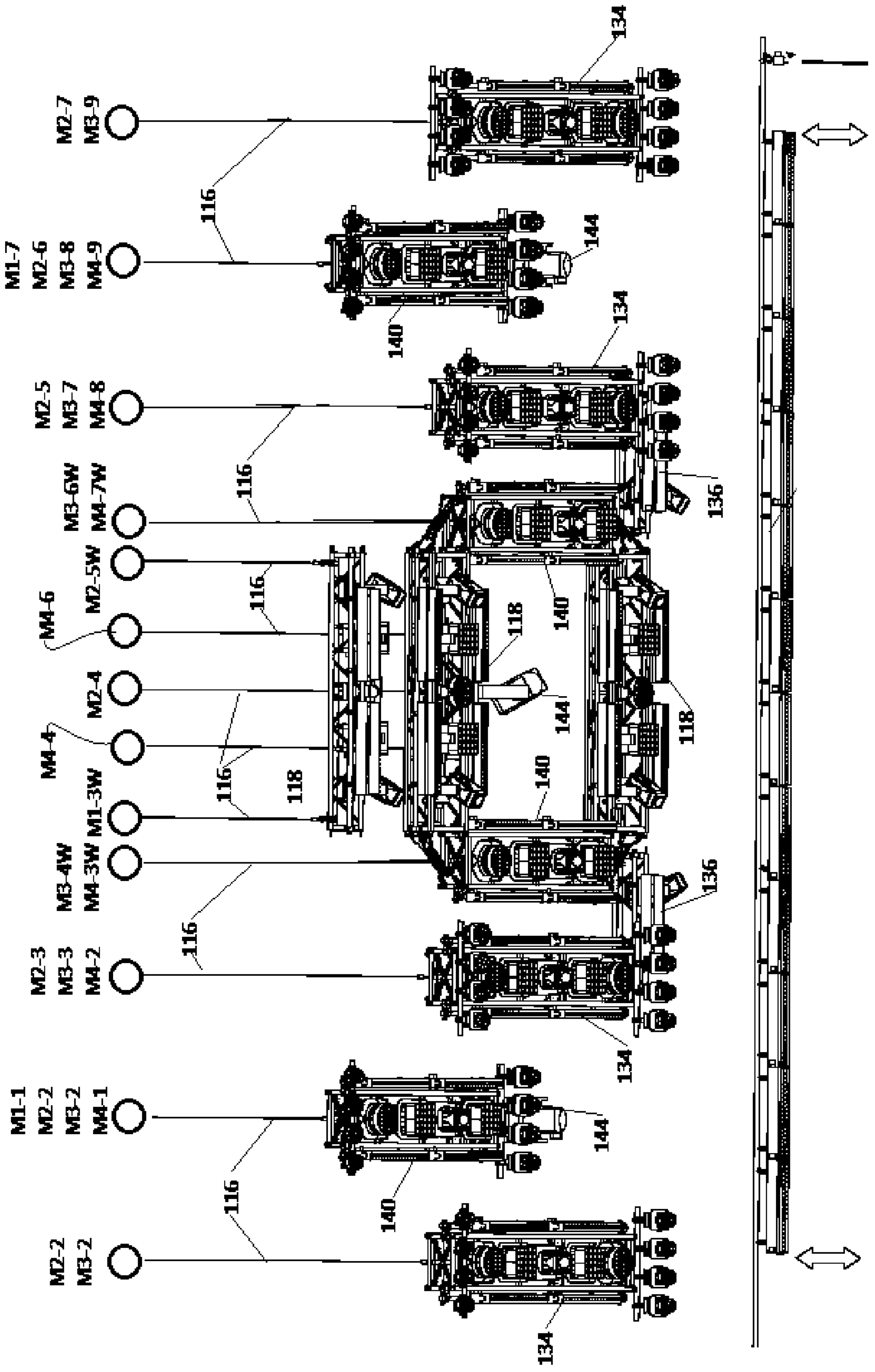
FIG. 4C1

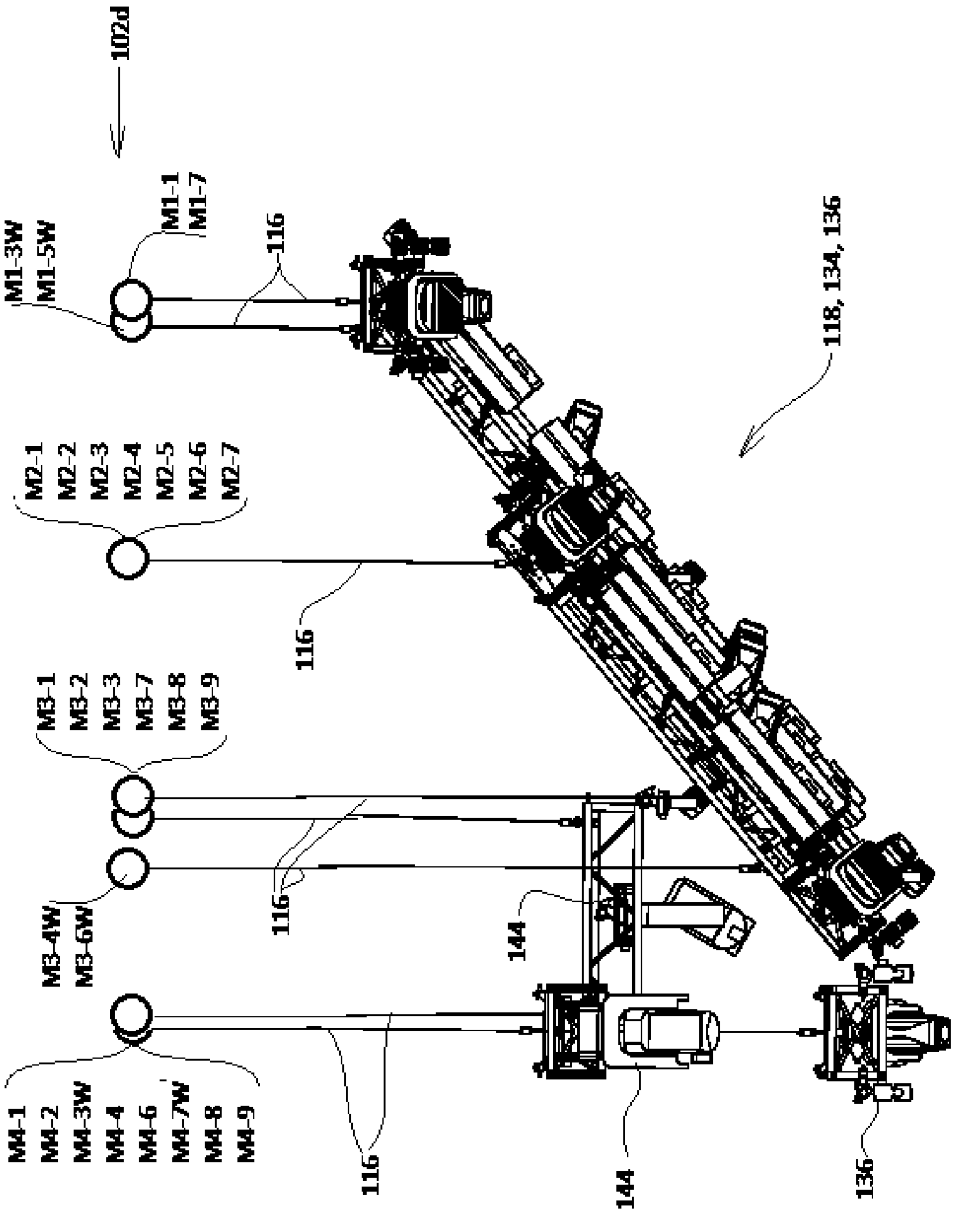
FIG. 4C2

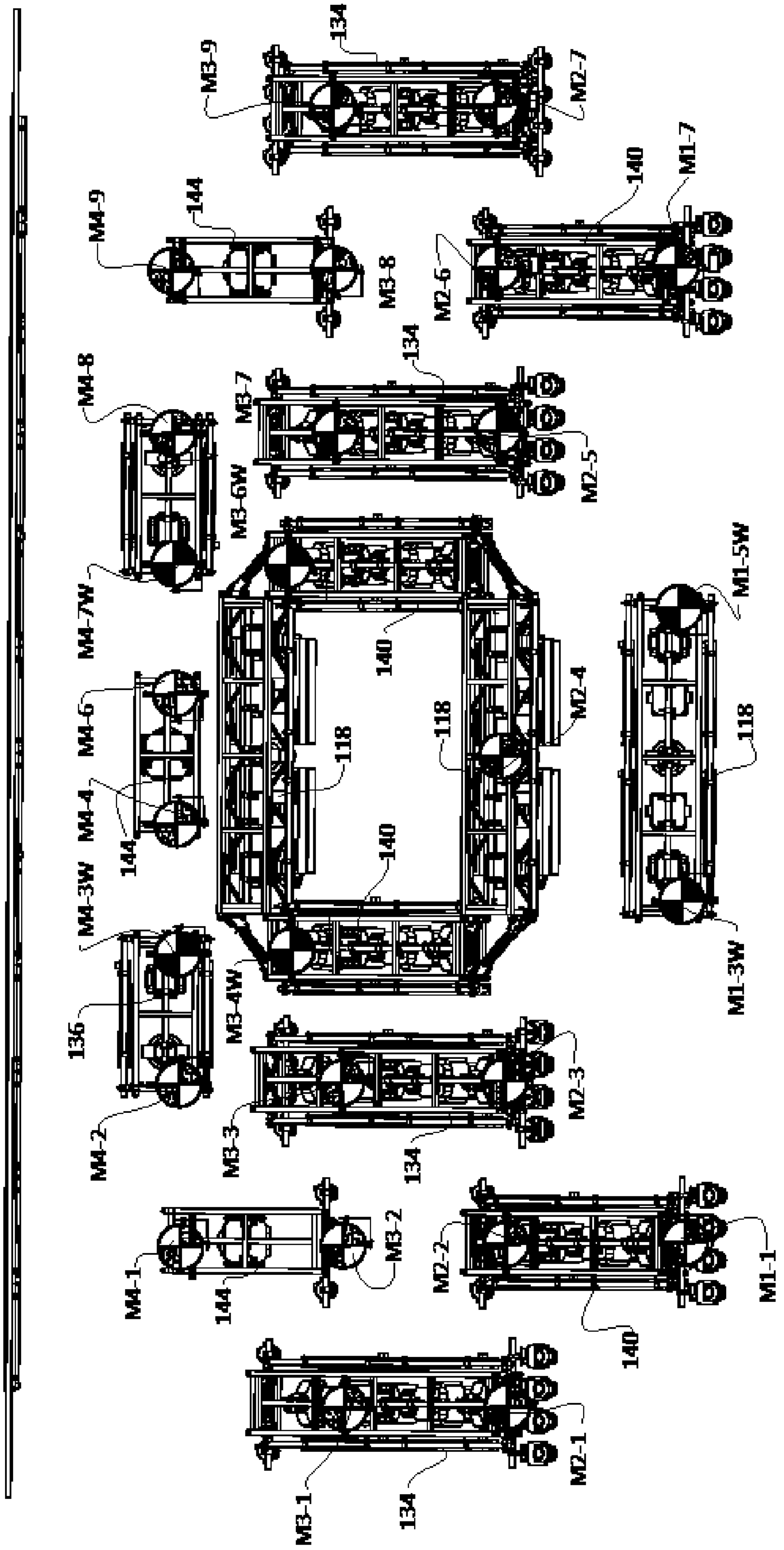
FIG. 4C3

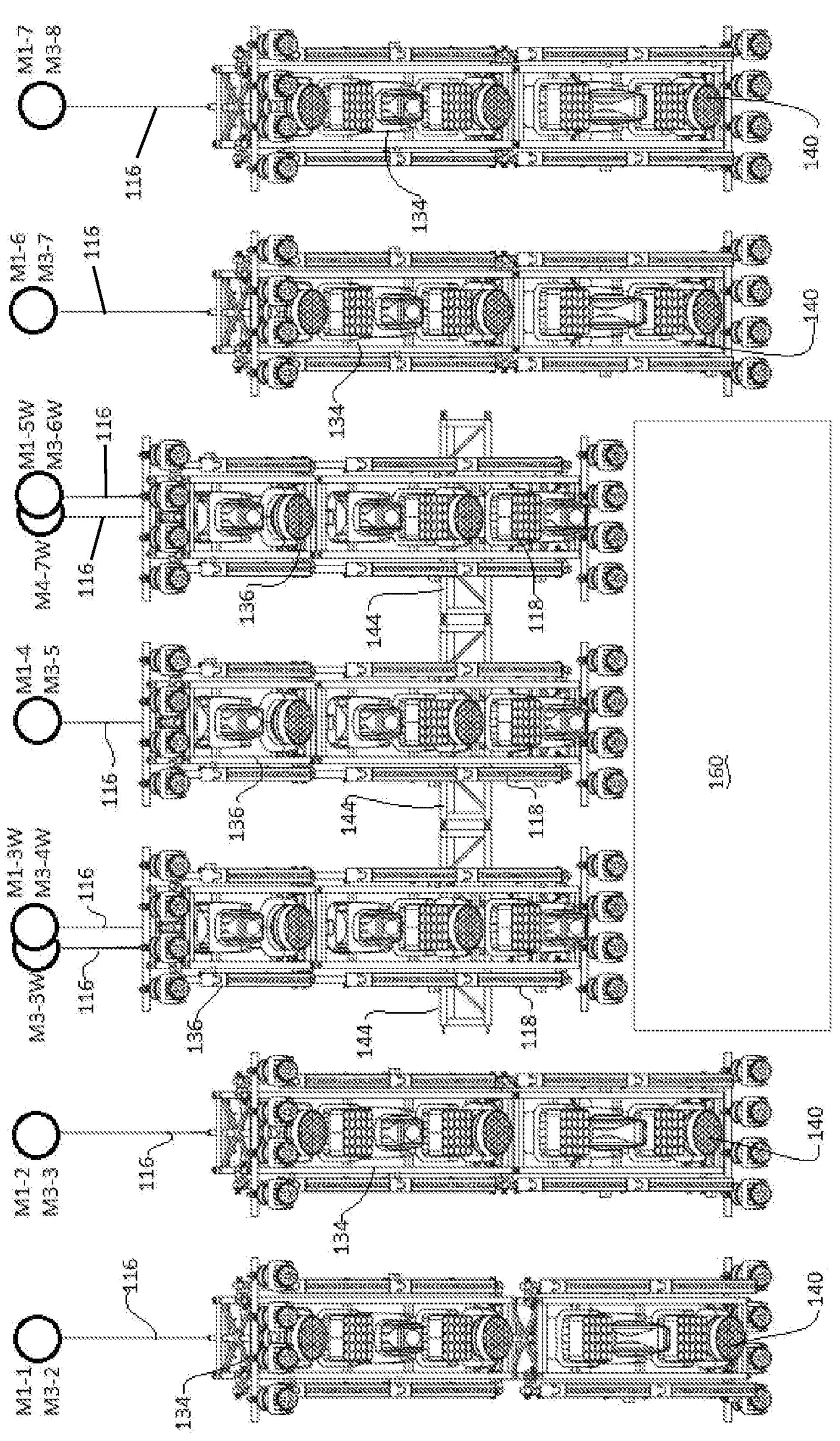
FIG. 4D1

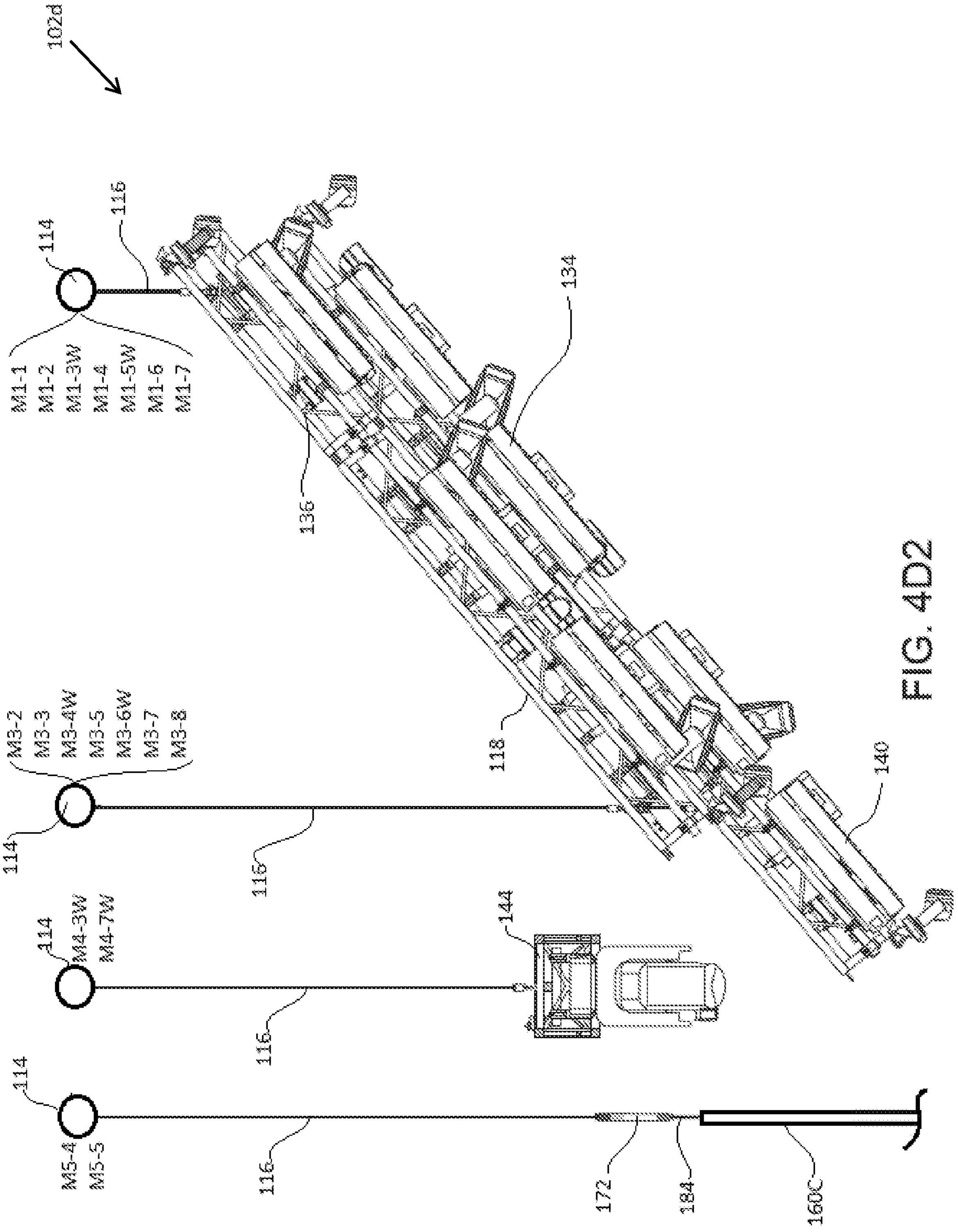
FIG. 4D2

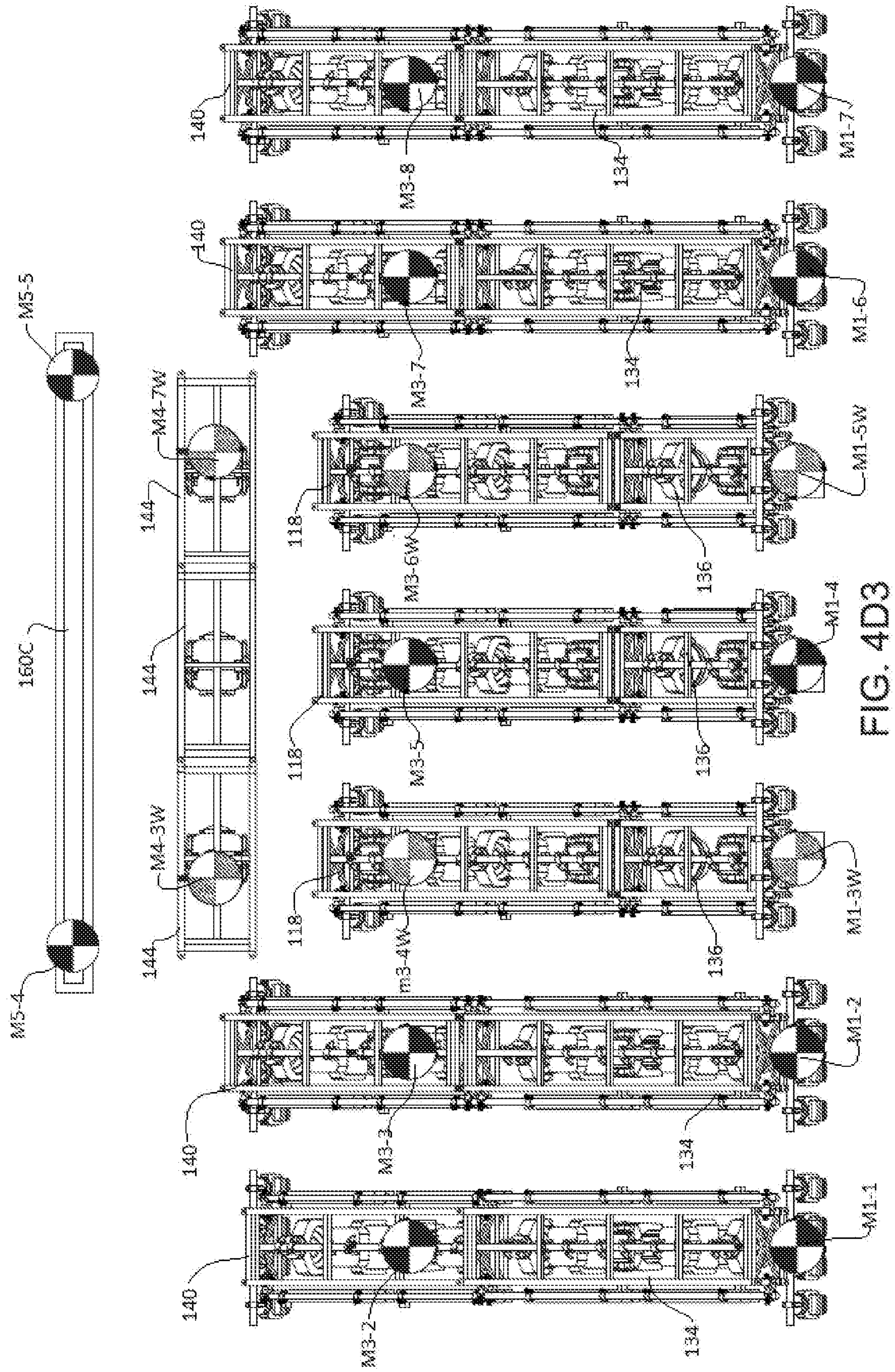
FIG. 4D3

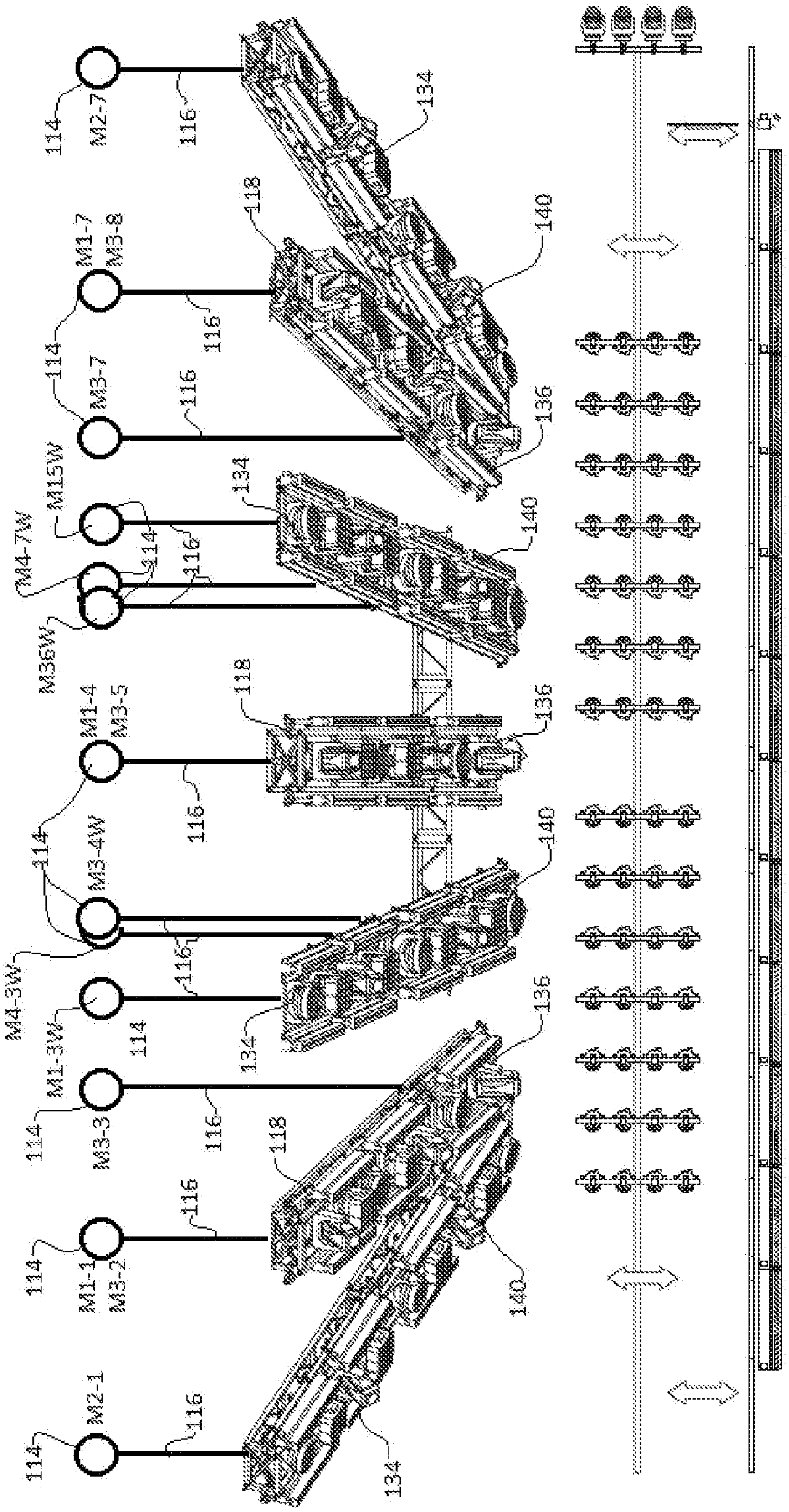
FIG. 4E1

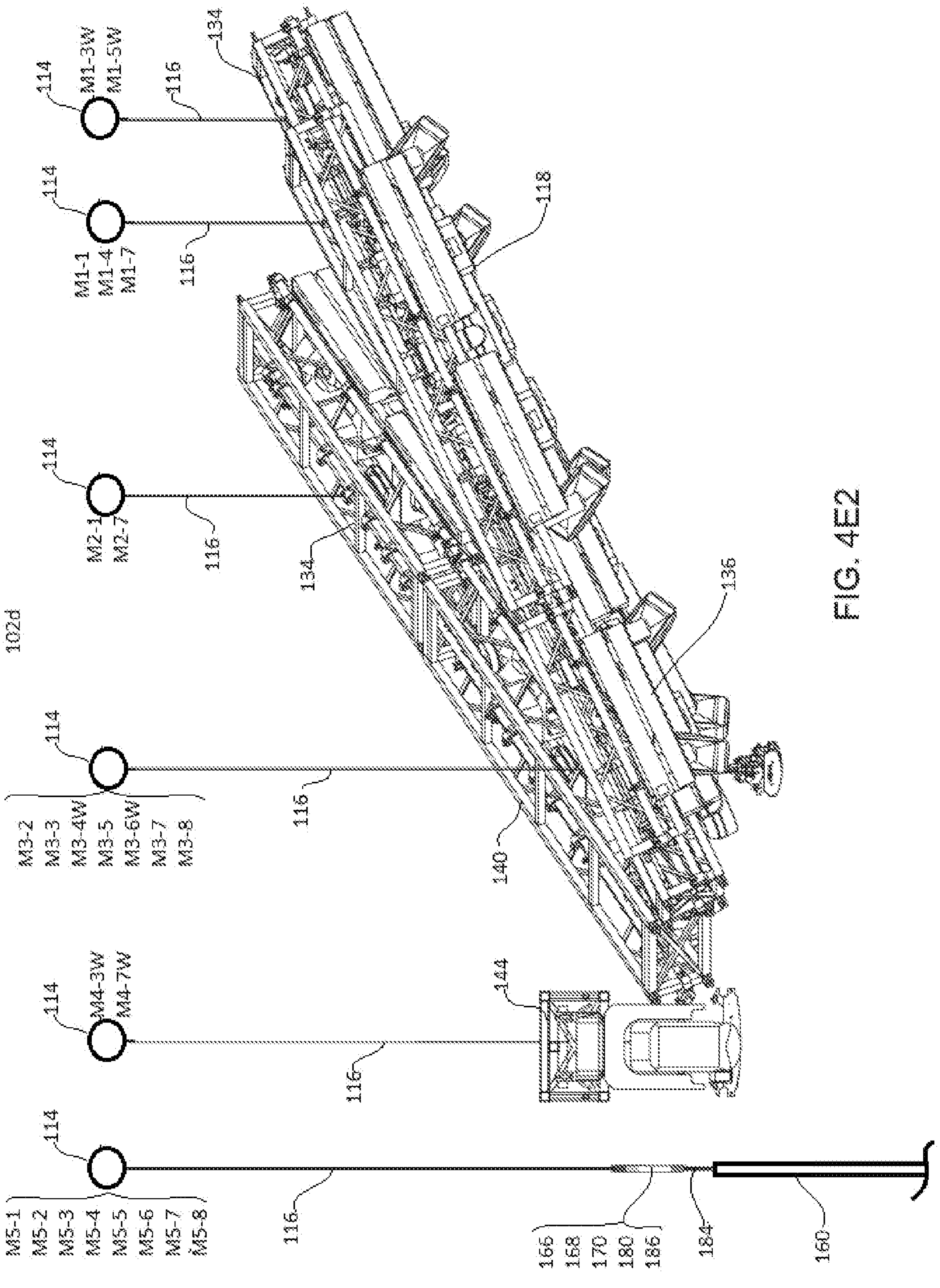
FIG. 4E2

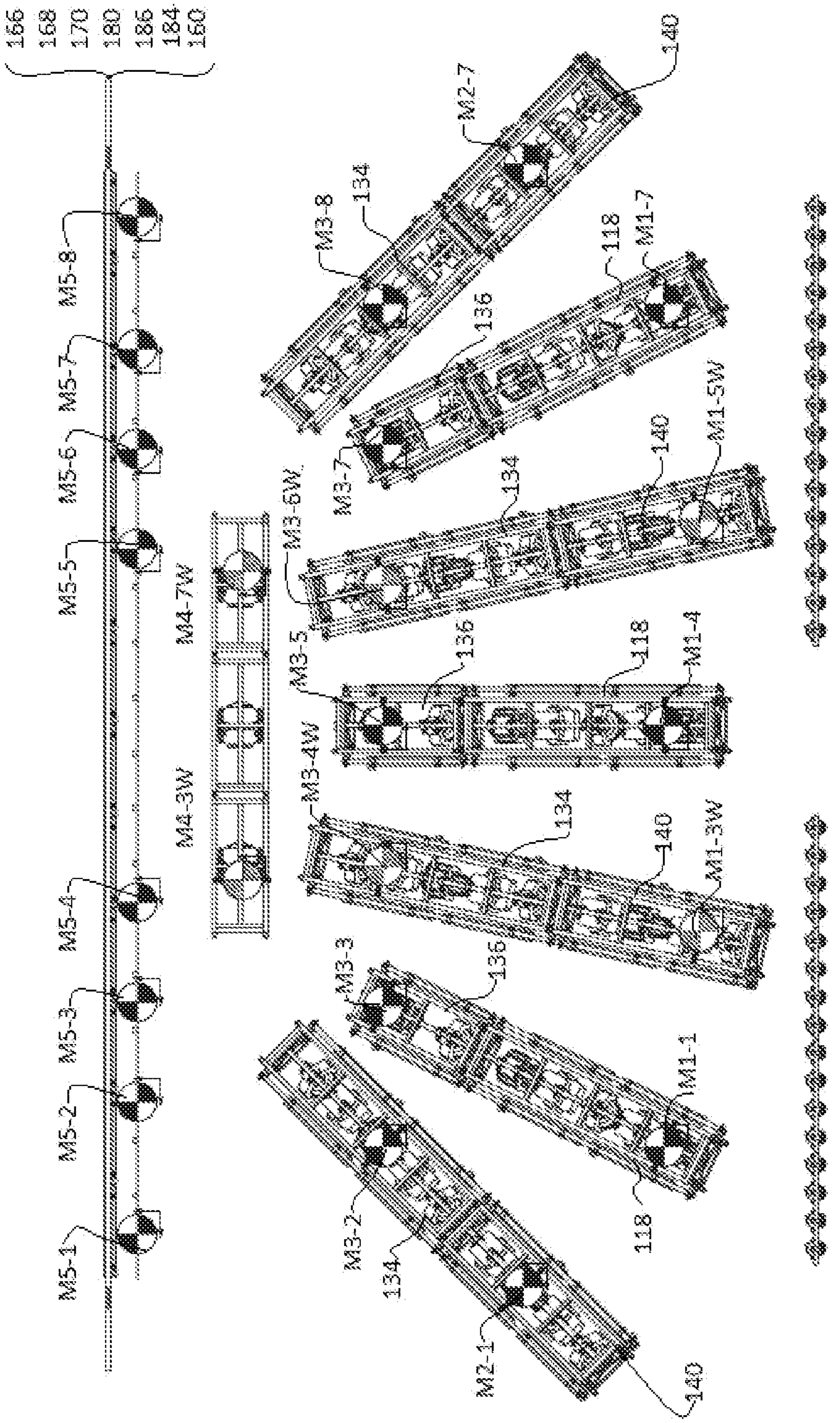
FIG. 4E3

MODULARLY CONFIGURABLE STAGING SYSTEM AND METHOD

RELATED APPLICATION DATA

This application claims the benefit of priority of U.S. Provisional Patent Application Ser. No. 62/881,224, filed Jul. 31, 2019, and titled Modularly Configurable Staging System and Method, which is incorporated by reference herein in its entirety.

FIELD OF THE DISCLOSURE

The present disclosure relates to theatrical, concert and show staging, and more particularly, to modularly configurable staging systems and methods.

BACKGROUND

Ever since at least 400,000 young people descended on Max Yasgur's dairy farm in upstate New York, for what was billed as "an Aquarian Exposition: 3 Days of Peace & Music", which became more commonly known as simply "Woodstock", music fans the world over have enjoyed attending large music festivals. Currently some of the largest and well-known music festivals in the United States include: Coachella, Lollapalooza, South By South West, The Electric Daisy Carnival and Bonnaroo. Similar festivals are held in Europe and elsewhere around the world.

A particular challenge in a performance festival setting is to provide staging appropriate to and desired by each act or performance. Conventional designs and processes utilize various systems such as video systems and lighting systems to create a "look" for the entire run of the show/festival which is then used by multiple acts during the course of the festival, with very few changes between acts. The reason for minimal changes is that an inordinate amount of time and work is necessary to make meaningful changes in the appearance of a staging scene using conventional techniques. In the example of a rock music festival, very typically there is one, and only one, lighting system hung over the stage that is used by every single act that appears on that festival's stage. While an individual band setup and a small floor package of lighting may change between acts, the larger staging scene set by the overhead lighting system and any video wall that may be used typically remains static in configuration.

In a festival setting, or other settings where multiple different acts or performances take place over a relatively short space of time, there simply is no time available or a method by which significant changes in staging appearance can be effected. In other words, conventional designs and processes utilize various systems including, most importantly, the lighting system to create a "look" for the entire run of the show/festival which is then used by multiple acts during the course of the festival, with very few changes between acts. Using conventional techniques, large staging scenes can take multiple days to tear down and more multiple days to rebuild, a process that simply is not possible in a festival performance setting.

Not only do these staging restrictions limit the creative appearance of the stage settings, but they also may limit or preclude certain acts from appearing in certain festival settings where their unique staging requirements cannot be adequately met given the time and resources available. There is therefore a continuing need in the art for a staging system that allows for quick changeovers between different staging scenes, meaning an ability to substantially change and/or create entirely new staging scene appearances in a matter of hours rather than multiple days needed for such changeovers using current systems.

SUMMARY OF THE DISCLOSURE

In one implementation, the present disclosure is directed to a method for rapid changeover of performance stage staging scenes. The method includes selecting a first plurality of preconfigured staging modules combinable to create a first staging scene; selecting at least a second plurality of preconfigured staging modules combinable to create at least a second staging scene; providing an overhead hoist grid above at least a portion of a stage area, the overhead hoist grid comprising an array of fixed hoist points; installing the first staging scene, comprising lifting the first plurality of preconfigured staging modules using selected fixed hoist points from the array of fixed hoist points of the overhead hoist grid to create the first staging scene; and changing the staging scene and installing the second or a subsequent staging scene, comprising: lowering preconfigured staging modules previously lifted with the overhead hoist grid to remove an installed staging scene, and lifting the second or a subsequent plurality of preconfigured staging modules using selected fixed hoist points within the array of fixed hoist points of the overhead hoist grid to create the second or a subsequent staging scene.

In another implementation, the present disclosure is directed to a method for rapid changeover of performance stage staging scenes. The method includes selecting from an inventory of preconfigured staging modules a first plurality of preconfigured staging modules combinable to create a first staging scene; selecting from the inventory of preconfigured staging modules a second plurality of preconfigured staging modules combinable to create at least a second staging scene; selecting from the inventory of preconfigured staging modules at least a third plurality of preconfigured staging modules combinable to create at least a third staging scene; providing an overhead hoist grid above at least a portion of a stage area, the overhead hoist grid comprising an array of fixed hoist points having lifting elements including power and communication connections; installing the first staging scene, comprising: connecting the first plurality of preconfigured staging modules to the lifting elements of a first plurality of selected fixed hoist points in the array of fixed hoist points, the connecting including lifting connections, power connections and communication connections, and lifting the first plurality of preconfigured staging modules using the first plurality of selected fixed hoist points to create the first staging scene; and changing the staging scene and installing the second staging scene, comprising: lowering preconfigured staging modules previously lifted with the overhead hoist grid onto dollies, disconnecting lowered preconfigured staging modules from lifting elements of the first plurality of selected fixed hoist points; connecting the second plurality of preconfigured staging modules to the lifting elements of a second plurality of selected fixed hoist points in the array of fixed hoist points, the connecting including lifting connections, power connections and communication connections, and lifting the second plurality of preconfigured staging modules using the second plurality of selected fixed hoist points within the array of fixed hoist points of the overhead hoist grid to create the second or a subsequent staging scene; and changing the staging scene and installing the third or a subsequent staging scene, comprising: lowering preconfigured staging modules previously lifted with the overhead hoist grid onto dollies, disconnecting lowered preconfigured staging modules from lifting elements of the second or a subsequent plurality of selected fixed hoist points; connecting the third plurality of preconfigured staging modules to the lifting elements of a third or subsequent plurality of selected fixed hoist points in the array of fixed hoist points, the connecting including lifting connections, power connections and communication connections, and lifting the third or a subsequent plurality of preconfigured staging modules using the third or subsequent plurality of selected fixed hoist points to create the third or a subsequent staging scene; wherein at least one of the first, second or third plurality of selected fixed hoist points comprises (i) a unique set selected of hoist points, and (ii) utilizes less than all fixed hoist points in the array of fixed hoist points.

In yet another implementation, the present disclosure is directed to a modular staging system permitting rapid changeovers between staging scenes. The system includes an overhead grid of fixed hoist points made up of an array of hoists having flexible lifting elements including power and communication connections; and a plurality of preconfigured staging modules of different types liftable by the lifting elements of selected hoist points of the overhead fixed hoist grid, wherein each different staging module type provides a different staging function or design effect.

BRIEF DESCRIPTION OF THE DRAWINGS

For the purpose of illustrating the disclosure, the drawings show aspects of one or more embodiments. However, it should be understood that the present invention as defined by the claims is not limited to the precise arrangements and instrumentalities shown in the drawings as briefly described below.

FIGS. 1A-D show different hoist grid embodiments, wherein:

FIG. 1A is a plan view of one embodiment of overhead hoist grid,

FIG. 1B is a plan view of another embodiment of overhead hoist grid installed on a master truss, FIG. 1C is a side view of the master truss hoist grid in FIG. 1B, and FIG. 1D is a plan view of a further alternative overhead hoist grid truss system according to the present disclosure.

FIGS. 2A-2E show different staging modules (pods) for use in disclosed systems and methods, with each figure showing top, side and end views of each module, wherein:

FIG. 2A is a larger spot light focused module,

FIG. 2B is a larger wash light focused module,

FIG. 2C is a smaller spot/wash light module,

FIG. 2D is a medium wash light focused module, and

FIG. 2E is a moveable follow spot module.

FIGS. 3A-F illustrate some examples of staging scenes possible with embodiments disclosed herein, wherein:

FIG. 3A shows a "dome scene",

FIG. 3B shows a "flat staggered scene" with a video wall,

FIG. 3C shows a "square scene",

FIG. 3D shows a "straight scene" with a video wall,

FIG. 3E shows a "fan scene",

FIG. 3F shows a further example of a square scene, this example including a smaller video wall.

FIGS. 4A1-4E show component details corresponding to the scenes illustrated in FIGS. 3A-E, wherein:

FIGS. 4A1, 4A2 and 4A3 show front, top and side views (by individual leg), respectively, corresponding to the dome scene of FIG. 3A, FIGS. 4C1, 4C2 and 4C3 show front, side and top views, respectively, corresponding to the square scene of FIGS. 3C and 3F, FIGS. 4D1, 4D2 and 4D3 show front, center side and top views, respectively, corresponding to the straight scene of FIG. 3D, and FIGS. 4E1, 4E2 and 4E3 show front, center side and top views corresponding to the fan scene of FIG. 3E.

FIGS. 7A-E show elevations, details and sections of lifting plates and splice plates for combining lifting plates in video wall staging modules, wherein:

FIG. 7A is a front view of a 16' video wall lifting plate,

FIG. 7B is a front view of an 8' left video wall lifting plate,

FIG. 7C is a front view of an 8' right video wall lifting plate,

FIG. 7D is a front view of a short video wall lifting plate, and

FIG. 7E is a front view of a 12' video wall lifting plate.

FIGS. 8A-D show elevations, details and sections of alternative lifting plates and splice plates for combining lifting plates in video wall staging modules, wherein:

FIG. 8A is a detail view of the end of a video wall lifting plate,

FIG. 8B is a detail view of a short video wall lifting plate,

FIG. 8C is a detail view of a splice plate connecting to video wall lifting plates, and FIG. 8D is a typical cross-section of a video wall lifting plate.

DETAILED DESCRIPTION

Figure 1A:
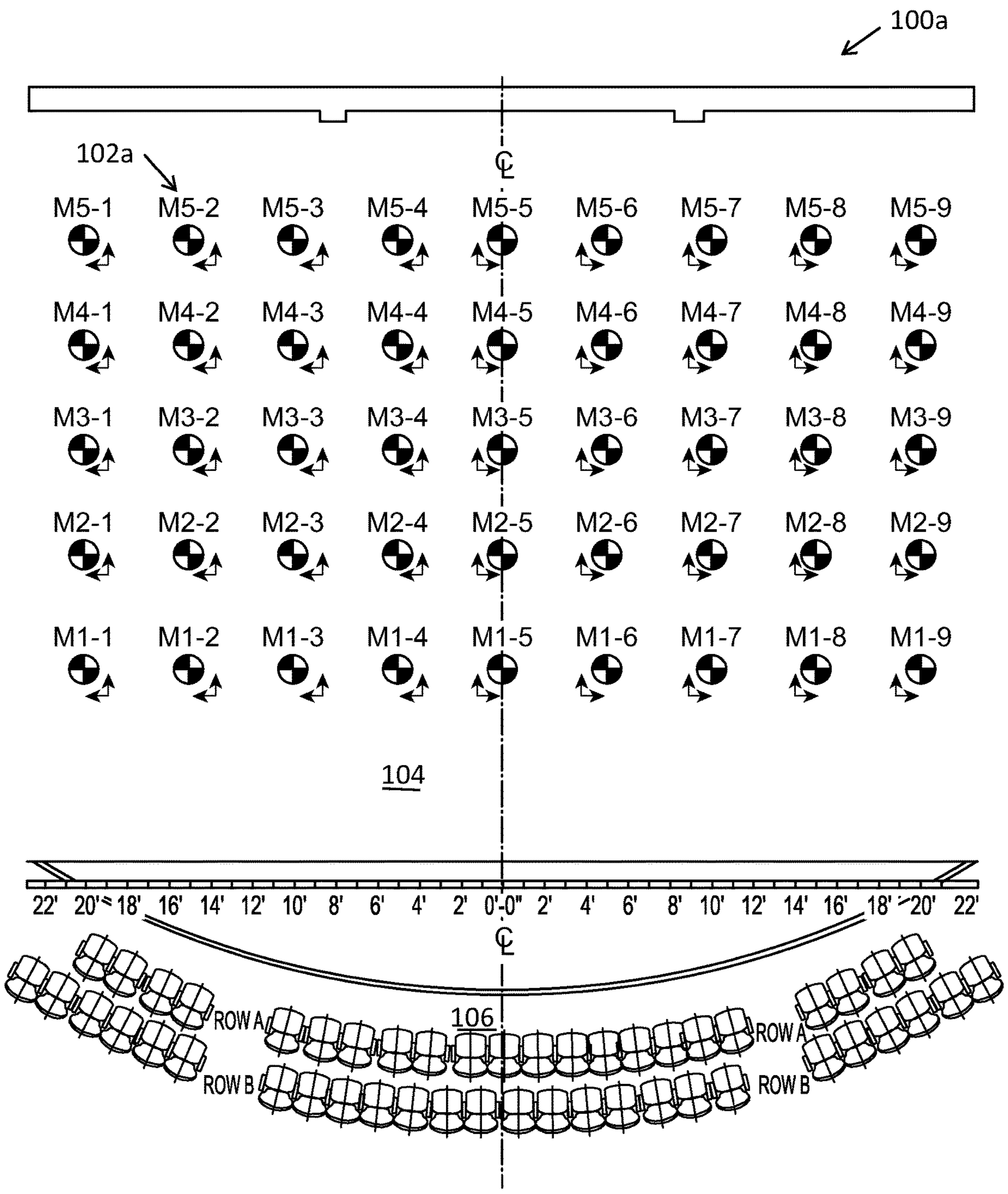

Modular stage rigging, lighting and AV systems and methods disclosed include an overhead hoist master grid and staging modules having a variety of equipment such as lighting and video, each preconfigured and adapted to be quickly and easily deployed in many combinations to efficiently create and switch between staging scenes. The staging modules may be preassembled thus providing for a vast variety of combinations of modular blocks so that many different kinds and shapes of stage lighting configurations and rigging presentations are achieved in a substantially reduced time frame relative to conventional staging systems and methods. The present modular system effectively creates a "plug and play" solution that allows performance venues to quickly reformat the stage for specific users' staging requirements, as well as providing an elegant visual design, thereby substantially reducing, and in some cases, eliminating the need for additional scenic stage elements. "Rapid changeover" between staging scenes is defined herein to be, at a minimum, complete changeover of the stage lighting configuration from a first to a second different configuration in not more than about 12 clock hours, and, more preferably, in not more than about 6 clock hours. In some embodiments, "rapid changeover" also includes change in configuration of a video wall as part of the staging scene within the same times.

The disclosed systems allow venues to customize to different show/performer needs by utilizing a series of modular building block configurations to create a personalized stage configuration or lighting design without the need for individualized builds, thus reducing costly start up, maintenance, and management of the high cost of touring. In general, advantages are realized in terms of efficiency and time savings for any type of performance involving complex staging changes.

The design and associated process provide flexibility to present a wide range of unique custom design applications, referred to herein as "staging scenes." Each different staging scene can be created by the combined efforts of the performers' team and the design team. The flexibility of the disclosed systems and methods arises from its "kit of parts" design, which is thus easily transported to venues, can be easily joined together on-site, and configured into specific different staging scenes to present each individual performer its' own design/look, and equally as important, can be re-configured within hours (instead of days or weeks) so that changeover time between performers is dramatically reduced. In a performance festival setting, for example, depending on staging configurations, it is possible that a first performer, using its own custom and unique staging scene, may end on festival day 1, and a second performer opens on festival day 2 with an entirely different custom and unique staging scene—a transition which using conventional staging techniques would have required days to effect. Additionally, systems and methods are scalable, providing flexibility to suit a variety of size venues both large and small by adding or subtracting modular elements.

As mentioned above, conventional designs and processes utilize various systems including the lighting system to create a single staging scene with a specific "look" for the entire run of the show/festival, which is then used by multiple acts during the course of the festival with very few changes between acts. By contrast, the modular systems and methods disclosed herein do not utilize a static approach to minimize changeover time, but use multiple equipment and processes to enable the stage rigging, lighting, audio, video, and scenery elements to be quickly and easily reconfigurable to create a new and unique staging scene for each act/artist, as well as reduce the labor and time required for the reconfiguration and presentation to audiences.

The overall look of the show is designed to be adaptable to create new show looks unique to each participating act. However, this design concept utilizes existing equipment providing for a vast variety of combinations of the stage equipment for making lighting, video and scenic structures of many different kinds and shapes.

While applicable in any venue or performance stage setting, the modular design of the disclosed systems and methods is especially well-suited for multi-act, festival-type events and performances where a different variety of different acts or performers perform on the same stage over a relatively short period of time, such as a week or weekend, or for back-to-back short runs in a theater as the system eliminates or substantially reduces "dark days" otherwise required for a changeover. The disclosed modular stage rigging and lighting systems and methods comprise modules adapted to be quickly and easily reconfigurable and assembled, thus providing for a vast variety of combinations of different modules so that many different kinds and shapes of stage lighting configurations and rigging presentations are achievable in a reduced time frame, in some cases multi-day time savings when measured in man-hours. The disclosed systems and methods provide a "plug in and play" format for all users that facilitate staging transitions while maintaining traditional staging values in visual and sound design thereby substantially reducing, and in some cases, eliminating the need for additional scenic stage elements. However, even in performance venues or events where rapid staging is not needed, the disclosed systems can be employed to increase efficiency and provide a greater range of flexibility in stagings at a reduced cost compared with traditional staging techniques.

Figure 1B:
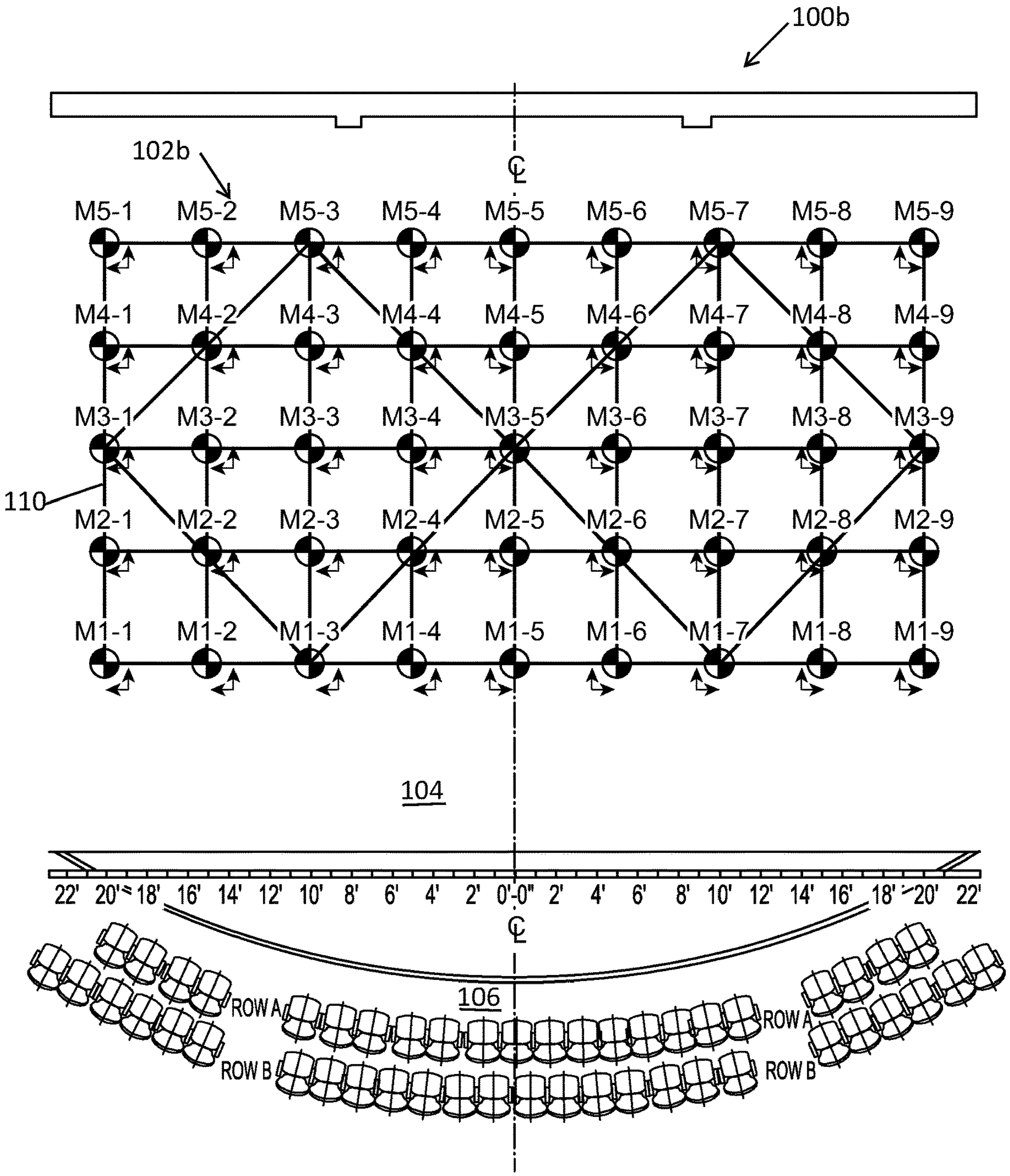
Figure 1C:
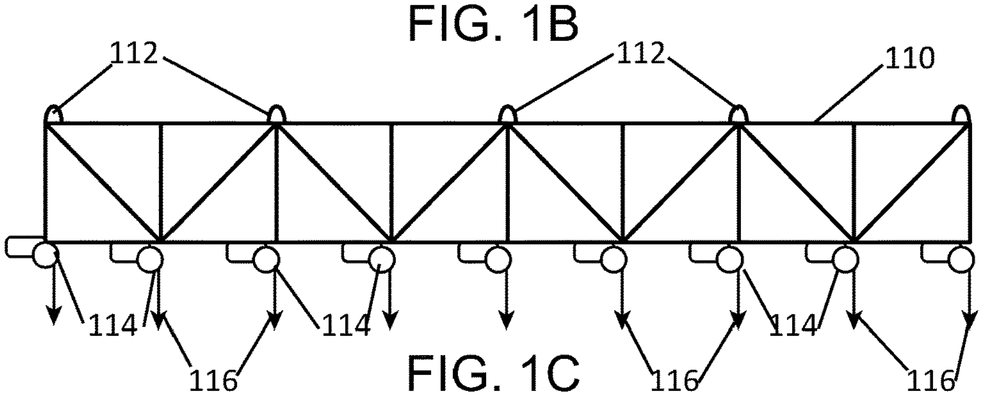
Figure 1D:
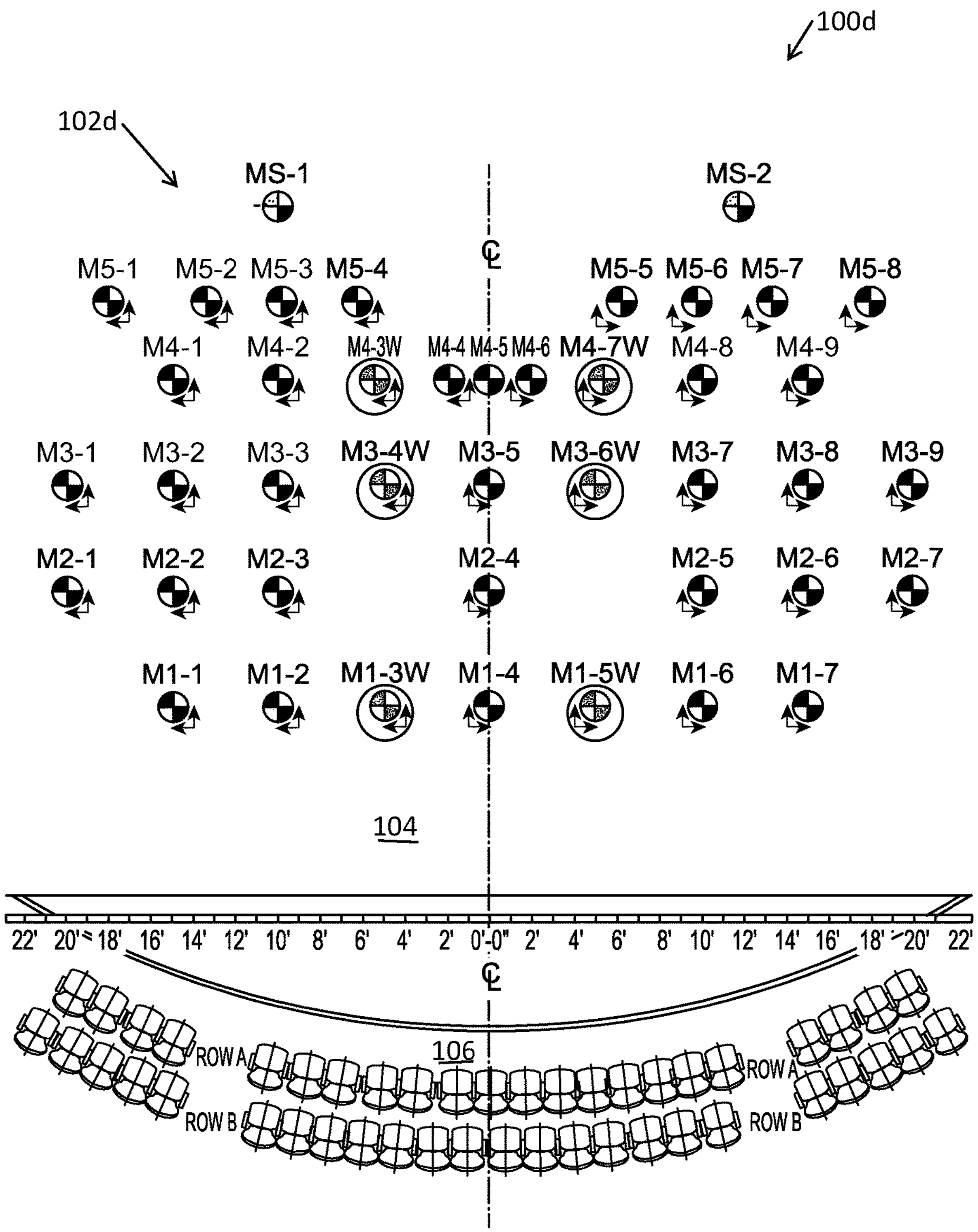

One element of the disclosed modular systems and methods is the overhead hoist grid as shown in FIGS. 1A-D. In the systems 100*a*, 100*b* and 100*d*, schematically depicted in FIGS. 1A, 1B and 1D, the overhead hoist grid 102*a*, 102*b*, 102*d*, respectively, is shown positioned above the stage 104, with the first rows of house seating 106 positioned for perspective and orientation. In some embodiments, it may be desirable to have the hoist grid extend out over initial rows of seating. In general, an overhead hoist grid according to the present disclosure comprises a substantially uniform grid of fixed location hoists attached to structural components of the venue over-lying the stage. Each location is designated by a letter and number indicating its row and row position in the grid. In a traditional theater house the over-lying structural components may be building/ceiling structure such as I-beams and structural bracing. Additional bracing/supports may be installed as needed to accommodate all hoist points in the substantially uniform grid. In a stadium setting, or other setting where the entire stage structure may be temporarily installed, hoists of the overhead hoist grid may be directly attached to the truss mother grid overlying the stage area. Examples of such directly installed overhead hoist grids are illustrated in FIGS. 1A and 1D.

In some situations it may be desirable to provide the overhead hoist grid with its own supporting structure or to provide it in modular form itself. In these situations, the overhead hoist grid may be provided as an independent truss system 110 as shown in FIGS. 1B and 1C. In this alternative embodiment, the substantially uniform grid of hoist points is provided on its own rigid truss, which can then be lifted to the stage overhead using lift points 112 by far fewer installed hoists than make up the grid itself. Individual hoists 114, corresponding to one row of hoist grid 102*b* are shown in FIG. 1C. The hoist grid truss structure may then be separately secured to the overhead or remain, and be used, suspended from the lifting hoists. In general, these arrangements of overhead hoist grids enable lighting, video, and scenery elements to be lifted by any number of combinations of hoists without relocating grid motor hoists.

Overhead hoist grids as described herein thus provide a plurality of motorized hoist points in a static grid configuration, which is unchanged regardless of staging scene and staging modules (discussed below) employed. Hoist points are identified in FIGS. 1A, 1B and 1D and are identified by row and position numbers, the row numbers beginning with "M" and the position numbers within each row having no letter prefix. The overhead hoist grid need not be a perfectly regular grid with hoist points located at every intersection of the grid as in FIG. 1A. FIG. 1D shows an alternative overhead hoist grid configuration in which a small number of grid intersections have been left without hoist points and two additional hoist points (M4-4 and M4-6) added between grid intersection points. Note that in the embodiment illustrated in FIG. 1D, two stage hoists have been incorporated into the hoist grid as row MS. In some instances it may be desirable to augment the fixed hoist locations within the overhead hoist grid by adding a number of moveable or repositionable hoist points. FIG. 1D also shows an example including six such moveable hoist points, provided by movable hoists designated with the suffix W after the position number. Any number of moveable hoist points may be included with the fixed hoist points of the overhead grid, but typically the number of moveable hoist points will be much smaller than the number of fixed hoist points.

Using a specifically configured overhead hoist grid as described herein, for example, grids 102*a*, 102*b* or 102*d*, as shown in the examples discussed above, staging modules such as illustrated in FIGS. 2A-E may be employed to quickly and easily change staging scenes. Hoists 114 may be remote operable chain hoists, cable hoists or other suitable capacity hoists configured to accommodate the size, weight and configuration of the modular staging components. Along with its lifting chain, rope, cable or other similar member ("lifting cable" hereinafter), each hoist at each hoist point is provided with cables for power and data, which may be integrated in a single cable assembly 116, such as an S400 cable in one example, to provide power and communication for the lifted staging modules. Because the overhead truss grid is preconfigured, each communication/power cable 116 may be addressed according to its grid location and connectable via buss plug or other standardized connection component in an integrated power and data distribution module. The power and data distribution for each staging module may incorporate one or more of the following features to permit data and power to be quickly and easily rerouted via reconfiguring patch cables and/or digital routing:

1. Single, dual, and three phase outputs
2. 400 amp Cam-Locks in and out
3. 120 v and 208 v outputs
4. Signal routing and control displays
5. Ethernet and DMX512 inputs and outputs
6. Digital current and voltage metering
7. Safety Interlock System
8. Modular Design
9. Capacity for additional integration of third party signal processing devices
10. Quick connect cables that carry both power and data Staging modules (PODs) used with the hoist grid may comprise various uniquely selected combinations of lighting fixtures and/or audio-visual components mounted on smaller truss structures, for example in 10', 8' or 5' lengths, with height and width in the range of 15" to 30". Conventional lighting fixtures, moving light fixtures and visual fixtures, such as projectors, may be mounted in these truss structures to form staging modules as further described below. A non-exhaustive set of example staging modules is shown in FIGS. 2A-E as a means of illustrating the great variety of staging modules, and thus scenes and effects achievable with embodiments of the disclosed systems and methods.

Figure 2A:
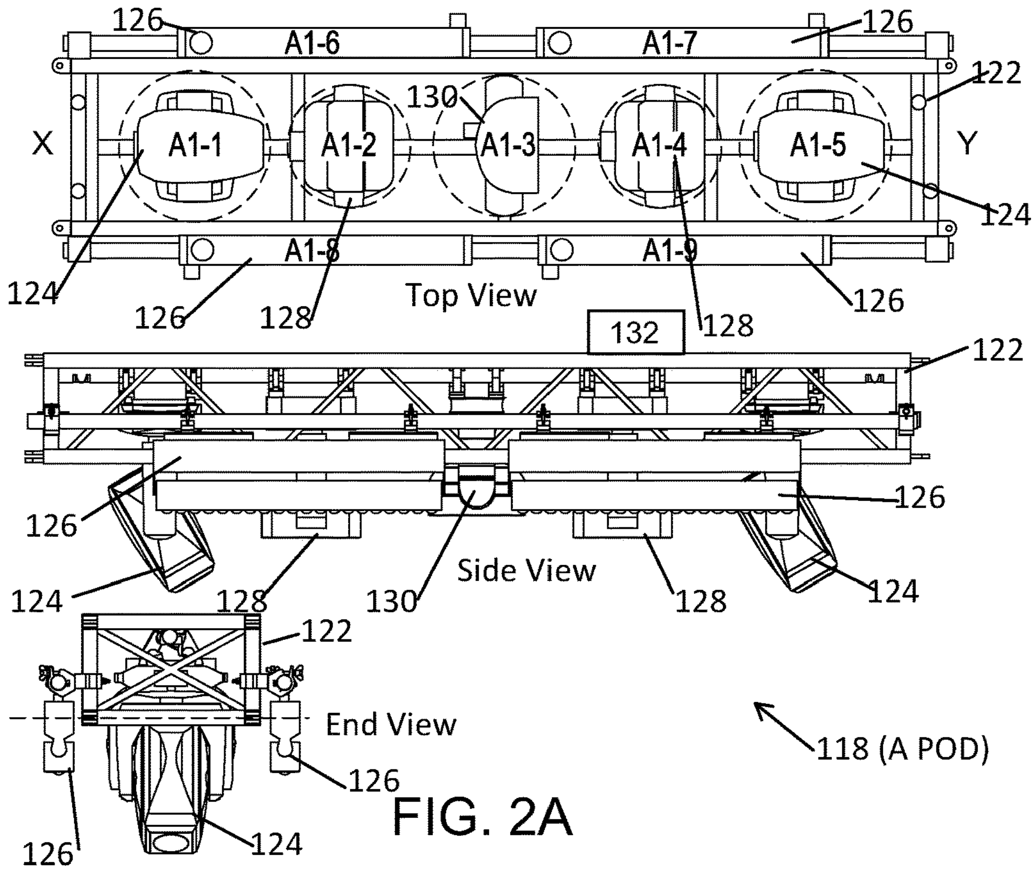

A large spot light focused module 118 ("A POD"), for example, is showing in FIG. 2A. In this example, A POD may comprise a 10' truss section 122 containing two spot light fixtures 124 (for example, PRG Icon® Edge) intended to provide a greater number of hard edge spotlights to achieve lighting effects such as creating graphic patterns in the air, both moving and static, and being able to "highlight" a single performer or area of the stage. Of the PODs described in this example, A POD has the greatest number of spotlight fixtures. A POD also has two linear LED fixtures 126 on each side (for example, GLP X4 Bar 20) and two square LED fixtures 128 (for example, Ayrton Magic Panel 602) to provide additional lighting effects and to correspond to components in B POD as explained below for unification of look when A and B PODS are used together. A central, round LED wash fixture 130 (for example, GLP X4 XL) is also provided in A POD. Note that fittings at the ends of truss sections permit them to be fastened directly together.

Figure 2B:
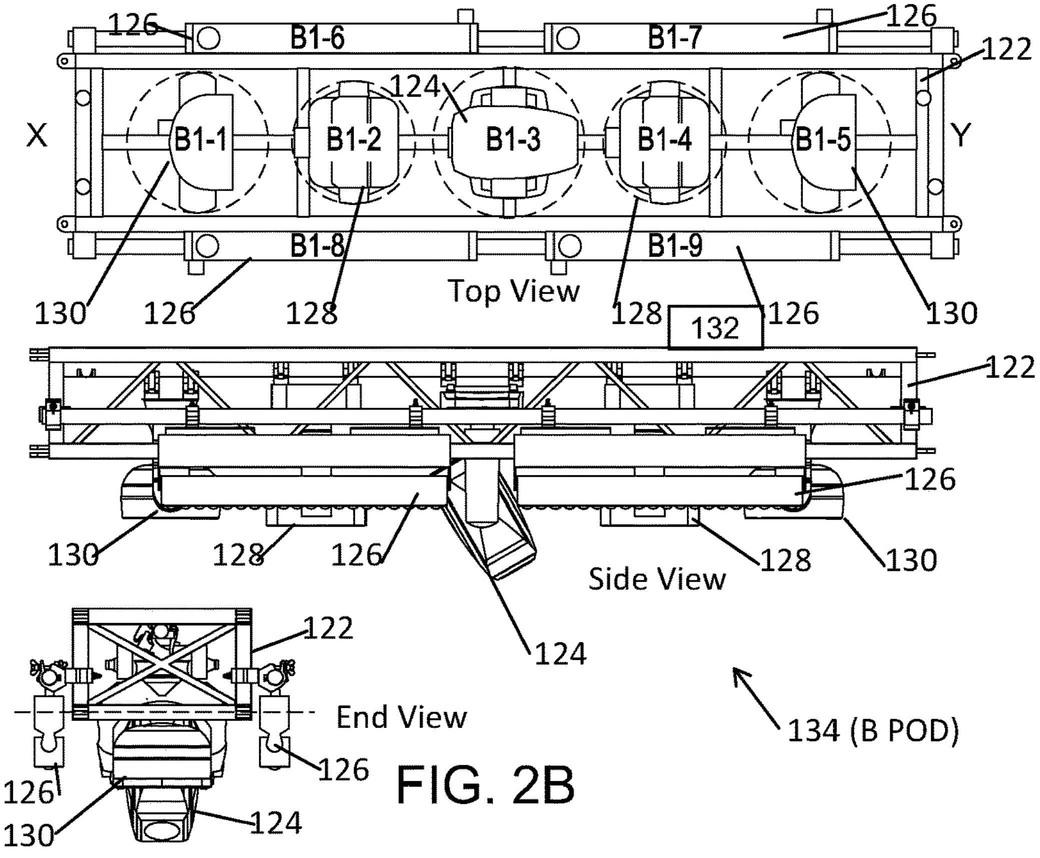
Figure 2C:
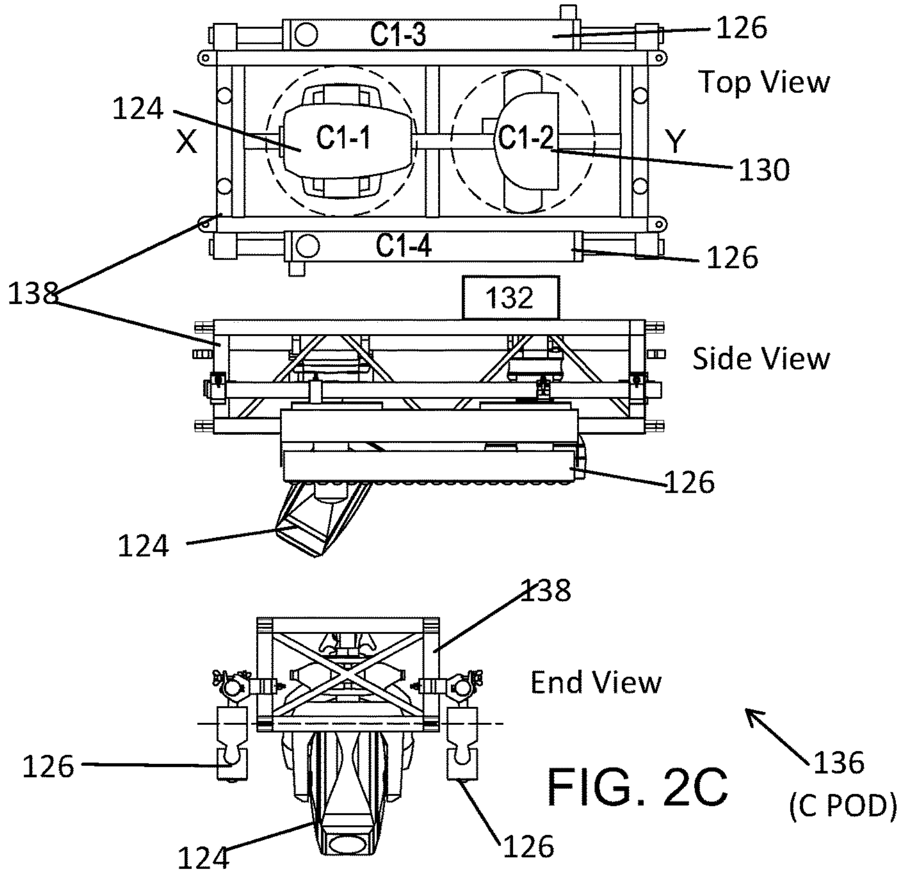
Figure 2D:
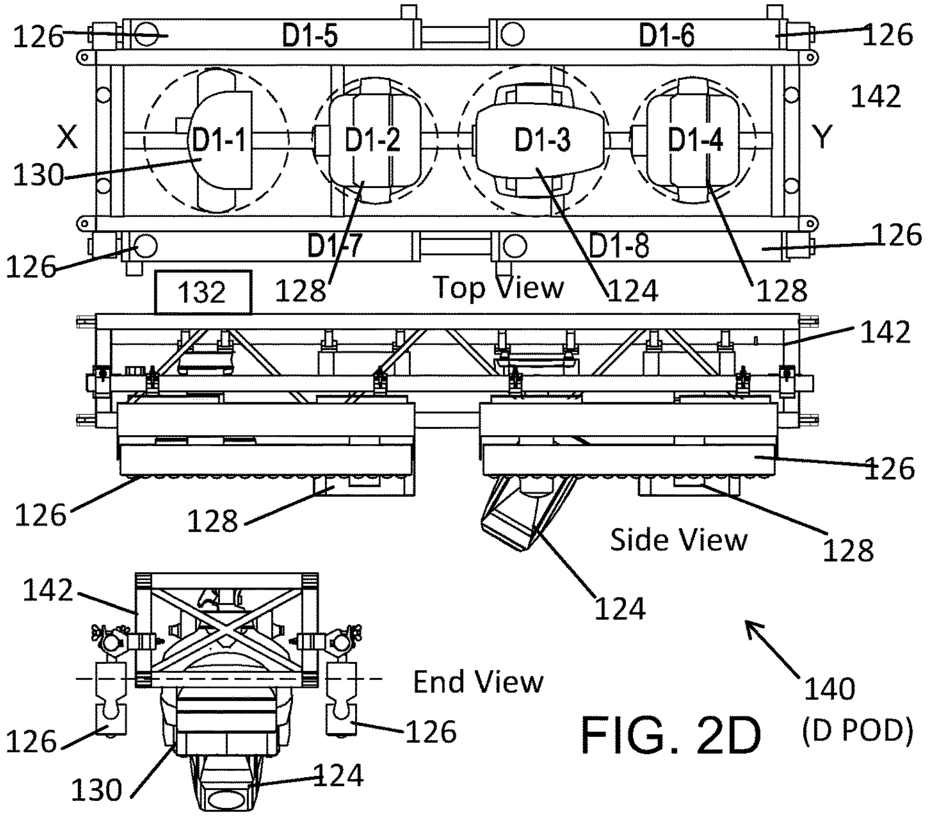
Figure 2E:
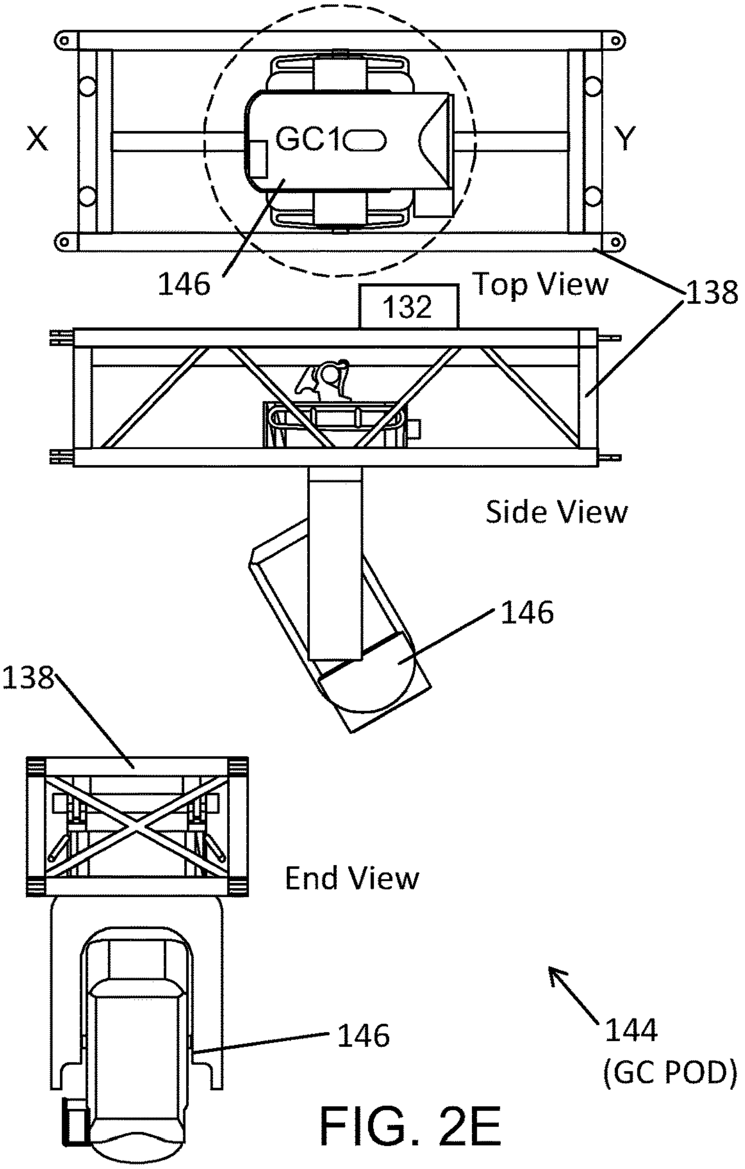

In one embodiment, control of fixtures in the POD may be simplified by use of a power and data distribution buss 132. As shown in each of FIGS. 2A-E, buss box 132 is mounted on the truss for each POD. As illustrated in more detail in FIG. 2G, buss box 132, for example, provides power and data communications to the fixtures A POD 118, C POD 136 and B POD 134. The system is scalable to control any number of similarly configured PODS(x-n). Overall control may be provided by one or more control modules 133 remotely positioned at a convenient location away from the stage area as needed. Control modules 133 communicate with buss boxes 132 on the POD trusses via trunk cables 131, which are attached to the cable assemblies 116 for each hoist 114 as described above.

Figure 2F:
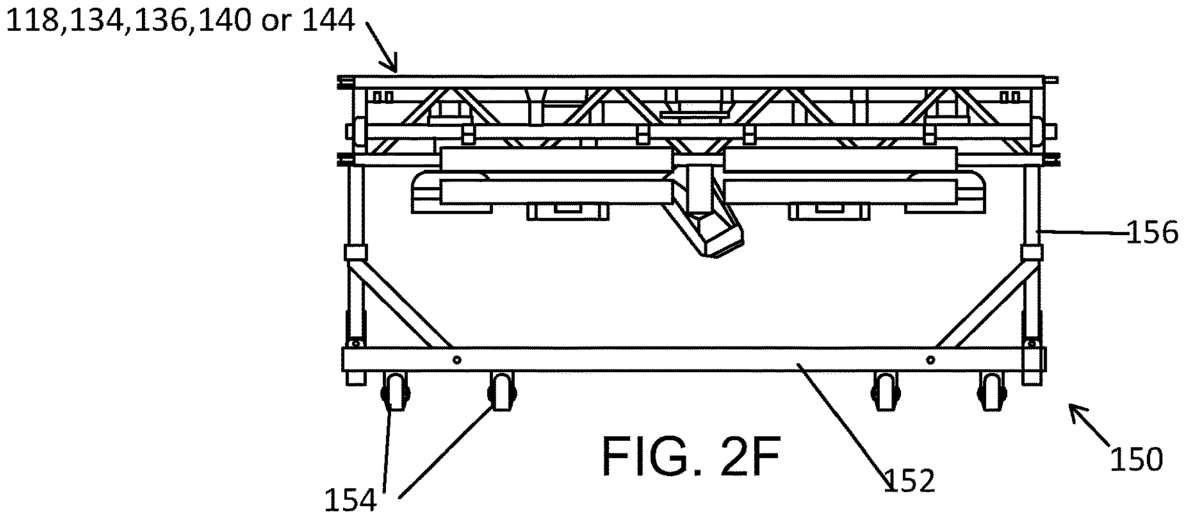
FIG. 2F illustrates an example of a dolly for transporting a staging module as shown in any of FIGS. 2A-E.
Figure 2G:
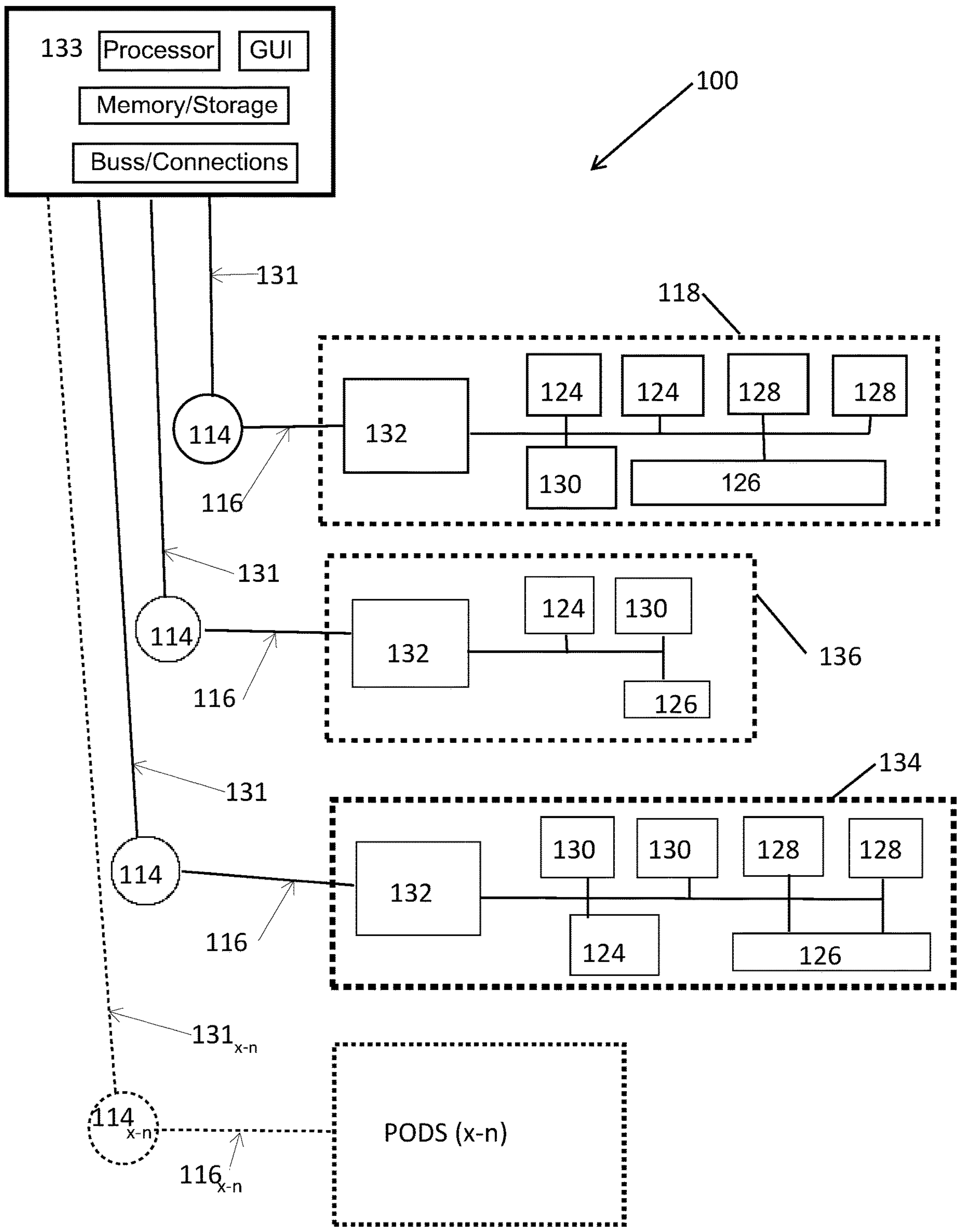
FIG. 2G is a block diagram illustrating an example of a control scheme for systems and methods described herein.

A variety of control schemes may be devised by persons skilled in the art using a basic control arrangement shown in FIG. 2F or variations thereof. In one example, control modules 133 control power delivered through the trunk cable based on the type of module and fixtures ultimately controlled, for example, power delivered may be 120 v or 208 v for common stage lighting fixture systems. Control modules 133 may utilize an Ethernet-based communication protocol, for example any of a variety of industry standard DMX over Ethernet protocols. Control modules 133 may include a processor, graphical user interface (GUI), appropriate storage and/or memory and communication buss/connections for trunk cables 131 and other systems that may communicate with control modules 133. In one example, using the GUI on control modules 133, a user may communicate to bus box 132 the required communication protocols, such as identification of the DMX universe to pull off the Ethernet network, down convert, and output the buss box XLR cables which send the data to the fixtures on the POD truss. In one example, each control module comprises two trunk outputs, as well as two Ethernet ports and two XLR 5 pin inputs. Multiple control modules 133 may be racked as needed. An example of control modules and buss boxes suited for this type of control is the PRG Series 400® power and data distribution system, and in which more details are set forth in U.S. Provisional Application No. 63/059,279 entitled "SYSTEM COMPONENTS FOR MODULARLY CONFIGURABLE STAGING SYSTEMS AND METHODS," which is incorporated herein by reference in its entirety. Note that this incorporated application also includes details on illustrative example fixtures identified above. Other control schemes and fixture specifics may be devised by persons of ordinary skill based on the teachings of the present disclosure.

B POD module 134, shown in FIG. 2B, is an example of a larger wash light focused staging module. In this example, B POD may comprise a 10' truss 122 with a plurality of round, wash light fixtures 130 (for example two, or more than in A POD). Using the arrangement of wash fixtures 130 shown in this example, B POD may be used to cover greater square footage of the stage than the spot fixtures and also can be provided with an ability to instantaneously change color using LED lighting to achieve faster color sequences than possible with spot lighting. Similar to A POD, B POD also has two linear LED fixtures 126 and two square LED fixtures 128 to provide additional lighting effects. A single, central spot light fixture 124 also may be included in B POD.

C POD module 136 is an example of a smaller spot/wash light module. As shown in FIG. 2C, C POD may comprise a 5' section of truss 138 containing one spot fixture 124 and one wash fixture 130. Configured as in this example, C POD can be utilized to provide configurations with more variety by having the same components as the other pods, but in a smaller size. With only one linear LED strip 126 per side, C POD maintains the visual look of the LED strips when combined with any other POD in this example group. C POD may also include a round LED wash fixture 130.

D POD module 140, as shown in FIG. 2D, is an example of a medium wash light focused module. D POD may comprise an 8' truss section 142 with two wash fixtures 128 so as to be essentially a smaller version of B POD 134. In this arrangement, D POD provides more variety for possible staging configurations by having the same components as the other pods, but in a smaller size. In this regard, an alternate D POD may comprise the elements of A POD 118, such as round LED wash fixture 130, linear LED fixtures 126 and spot fixture 124, but also in a smaller package.

In a further variation, GC (Ground Control) POD module 144 presents an example of a moveable follow spot module. As shown in FIG. 2E, GC POD 144 may comprise a 5' long truss section 138 containing a moveable follow spot light 146 (for example, PRG Best Boy® HP Spot Luminaire with remote Ground Control). This is a specialized type of moving light that can become (when combined with an appropriate ground control system) an active follow spot, which can "follow" performers onstage no matter where they roam. Unlike all of the other lights in the other PODS, which typically need to be programmed, because this follow spot light has a human operator attached to it, it can be focused anywhere on the stage "live" and the performer does not need to be in a predetermined area to be hit by this light. In one example, a system with three GC PODs allows for up to three follow spots to be placed anywhere within the stage rigging scene.

In order to facilitate quick staging changeovers, each of the PODs, as shown in any of FIGS. 2A-E, or as may otherwise be configured by persons skilled in the art based on the teachings herein, may be mounted on a dolly 150 for transportation and positioning (FIG. 2F). Dollies 150 may comprise a base 152 with castors 154 and truss support structure 156.

In one illustrative example, an embodiment of the disclosed systems may be used to create at least the six different staging scenes of FIGS. 3A-F. Such a system embodiment may include three A PODS 118 (FIG. 2A), four B PODS 134 (FIG. 2B), three C PODS 136 (FIG. 2C), four D PODS 140 (FIG. 2D), and three GC PODS 144 (FIG. 2E). With the specific example PODS described above, secondary effects are achievable when multiple PODS are combined. For example, combined, the linear LED strip fixtures that are on the outside chord of every example type of POD above (other than the GC POD) creates a visual unification to the overall look of the lighting system and design. These linear fixtures can be selected to create long, continuous "curtains" of light, which are very different in texture and feel than a regular spot or wash fixture, which can have a concentrated, almost singular source. As will be appreciated by persons skilled in the art, other example systems may be created with any combination and number of PODS as described herein and/or using other PODS based on the teachings presented herein.

Figure 6:
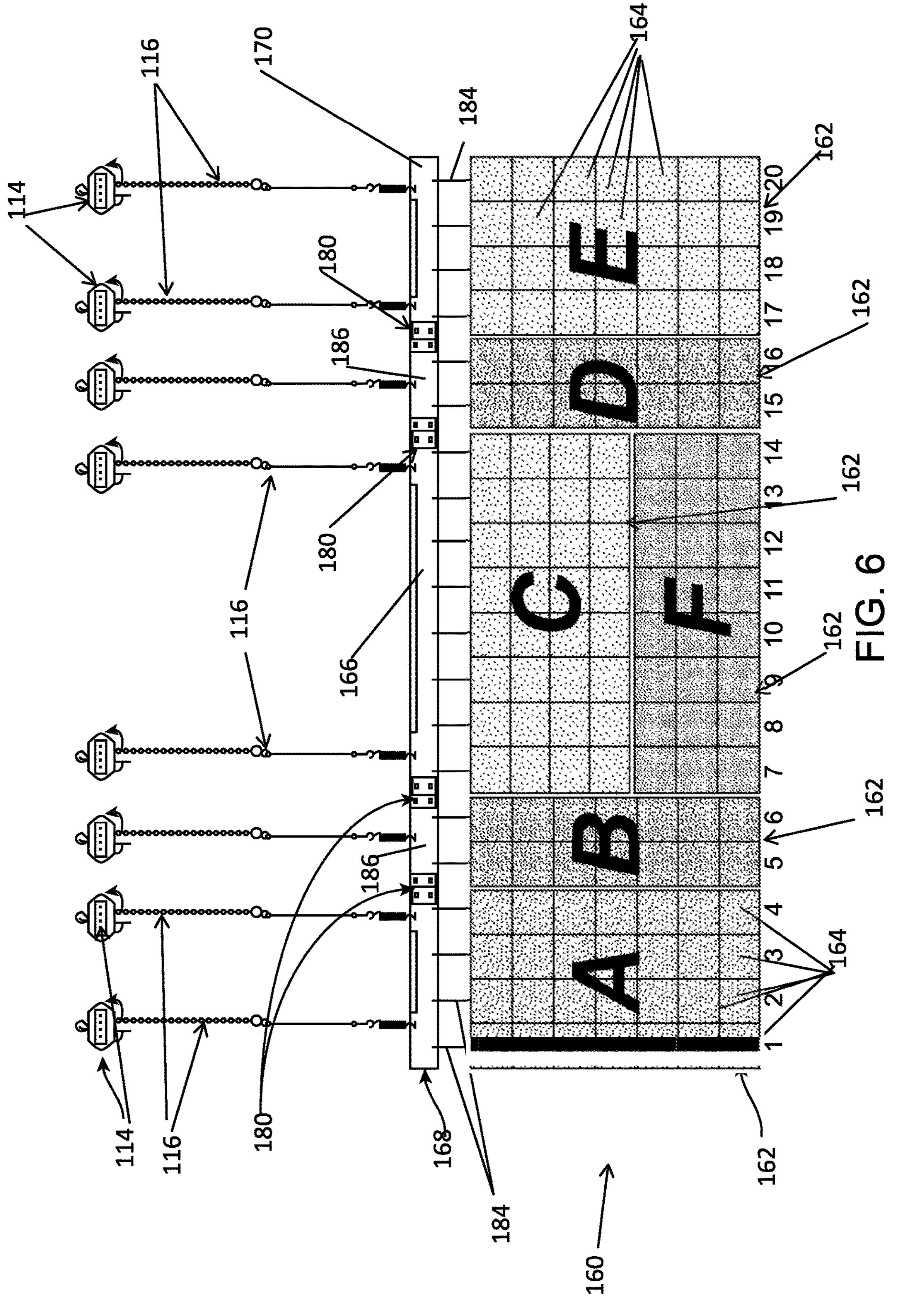
FIG. 6 shows embodiments of video wall staging modules for use with the disclosed system and method.

Video walls or LED video monitor arrays are another type of staging module that may be incorporated into embodiments of the systems and methods described herein. Video staging module embodiments, and details thereof, are shown in FIGS. 6, 7A-E and 8A-D. FIG. 6 illustrates one example of a configuration of a video wall 160, made up of LED video modules 162, which are each made up of an array of LED video tiles 164. The basic arrangement of various types of video walls, including those employing arrays of LED tiles, are well-known in the art. One example is described in U.S. Pat. No. 9,477,438, entitled "Devices For Creating Mosaicked Display Systems, and Display Mosaic Systems Comprising Same," which is incorporated by reference herein in its entirety.

One component of the video staging modules disclosed herein is a modular lifting plate, different examples and features of which are shown in detail in FIGS. 7A-E and 8A-D. The lifting plates provide high capacity load rated hardware for use in the overhead lifting of video wall elements. The lifting plates enable video walls to be assembled and disassembled in reconfigurable sections allowing one LED screen system to be configured into multiple assemblies. Traditional LED or video display module walls incorporate in their design a structural bar(s) along their top edge in order to properly support and hang the wall. This structural bar, typically referred to as a "bumper" within the industry, forms the main structural element which all modules hang from forming an individual column of modular display tiles. Columns are then attached side by side along their vertical edge to create the video display wall. Each section of structural bars or "bumpers" requires a support system to safely hang the entire video display wall. This is typically achieved with theatrical rigging, like a chain motor, to pick up each section. Additionally, each different manufacturer of LED or video display module walls have their own unique bumper design.

The modular lifting plates disclosed herein are components in video staging modules that provide an LED and/or video display module structural support system that addresses the shortcomings of traditional bumpers. Video staging modules employing the disclosed modular lifting plate system enable a large scale array containing multiple display modules to be quickly assembled and disassembled in sections while maintaining full structural and load bearing support. For example, using traditional techniques a video wall would have to be assembled in its entirety one level at a time. If the wall was 60' wide, the entire width of the wall, 60', would have to be assembled at the same time. The disclosed lifting plates provide a modular and scalable system which enables a production to assemble or disassemble a section of a video wall into reconfigurable sections in a timely and cost-effective manner. For example, if there was a video wall that was 60' wide, the modular lifting plate would enable the wall to be assembled in multiple smaller sections such as two 30' sections, or three 20' sections. Modular lifting plate embodiments, as shown in FIGS. 7A-E and 8A-D, include a number of unique features:

1. Has multiple holes along the bottom of the plate that are spaced to accommodate any manufacturer's LED or video display module.
2. Can be made of structural steel, aluminum, composites, and/or a wide variety of other alloys.
3. Due to its unique design, it is structural in nature so it can be supported with a minimal amount of theatrical rigging that is far less than traditional LED or video display module bumpers require.
4. The design is scalable and can be lengthened or shorted to accommodate the size of the desired section required via optional splice plates.
5. Unique design enables a high load capacity.

6. Lifting plates have a narrow width that does not exceed the depth of the LED or video display module that is hanging from it.
7. Has a structural spine to keep the bumper and the wall hanging below it from bowing.

Figure 7A:
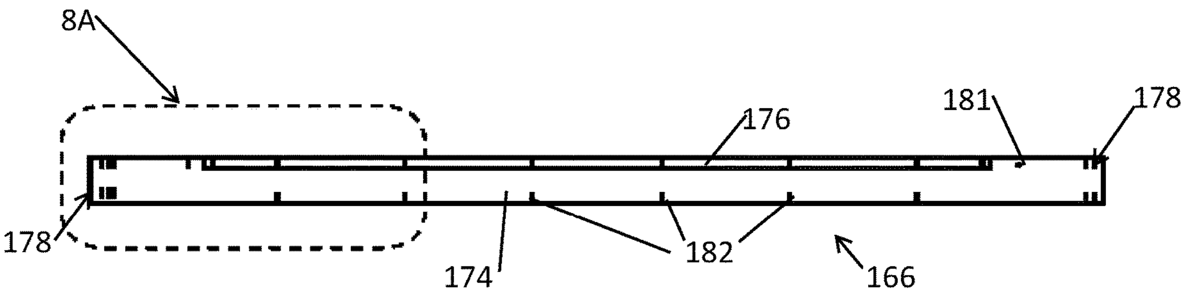
Figure 7B:
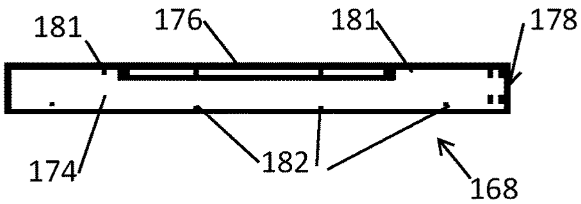
Figure 7C:
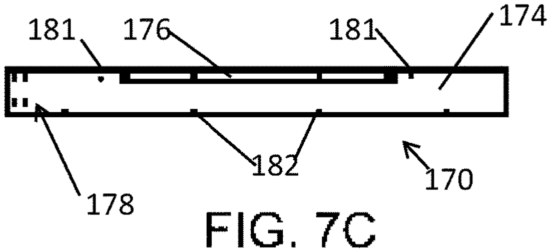
Figure 7D:
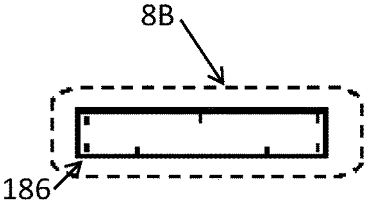
Figure 7E:
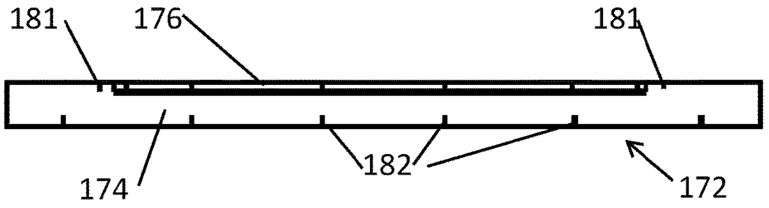
Figure 8A:
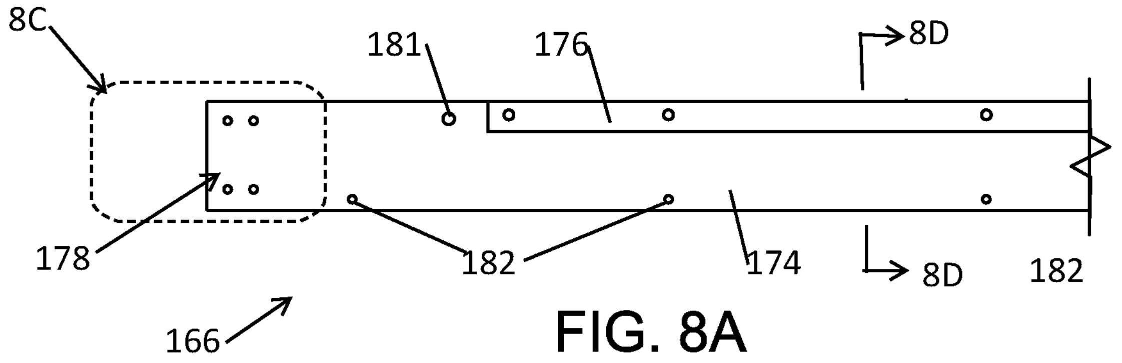
Figure 8B:
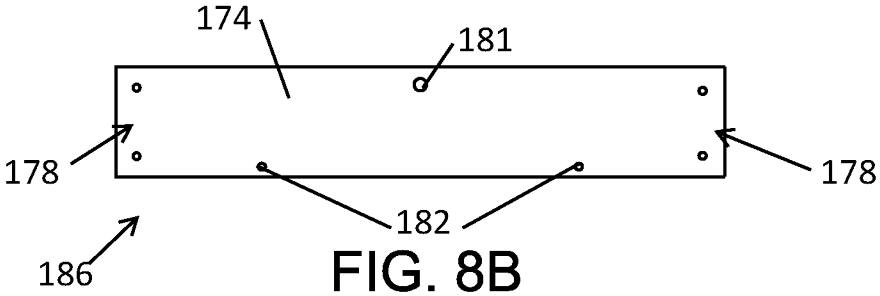
Figure 8C:
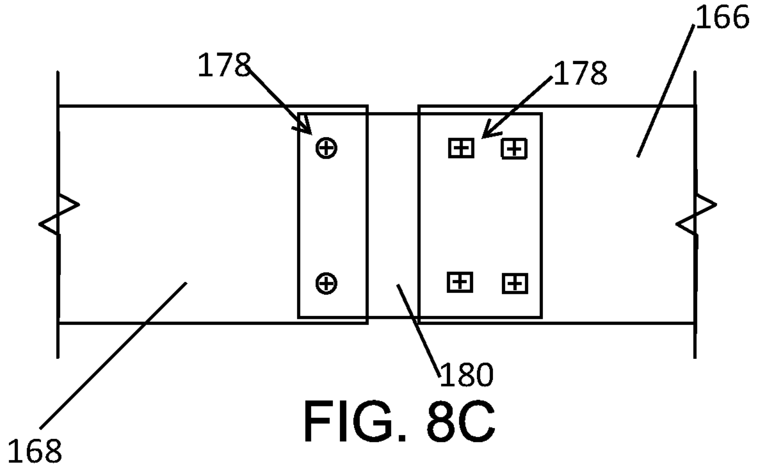

With reference to FIGS. 7A-E and 8A-D, in one example, each of lifting plates 166, 168, 170, and 172 generally comprise a plate member 174 with a stiffening shape 176 bolted thereto. Plate member 174 for each lifting plate may comprise an 8 inch wide, one-half inch thick aluminum plate of appropriate length. As shown in cross-section of FIG. 8D, stiffening shape 176 may comprise a 2"×2"×3⁄16" steel square tube. In FIG. 7A, lifting plate 166 is approximately 16 feet in length with four bolt holes 178 at each end of plate member 174 to facilitate connection to an adjacent lifting plate via splice plate 180, as shown in FIG. 8C. Two lifting holes 181, for attachment to cable assemblies 116 are positioned just beyond the end of stiffening shape 176. A series of spaced attachment holes 182 along the bottom of the plate member provide anchor points for cables assemblies 184 (see FIG. 6) that support and provide power and data to video tiles 164. Attachment holes 182 in one embodiment may be ½" diameter holes. Alternatively, separate cable connections to cable assemblies 116 may be provided to connect to the video tiles. FIG. 7B shows left side lifting plate 168 with four connecting holes 178 at the right end and four attachment holes 182 along the bottom edge. Right side lifting plate 170, shown in FIG. 7C, is a mirror image of left side lifting plate 168. FIG. 7E shows a 12' lifting plate with no connection holes. However, it does have attachment holes 182 along the bottom edge, as do the other lifting plates. FIGS. 7D and 8B show an example of a short lifting plate 186, which may be about 4' long and therefore does not require a stiffening shape and has only two connecting holes 178 at each end. In this example, two attachment holes 182 are provided along the bottom edge and one lifting hole 181.

Figure 8D:
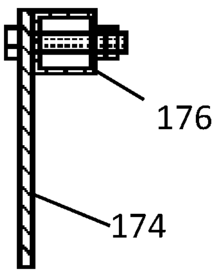

FIG. 8A shows a detail view of a left end of lifting plate 166, but which is also the same for one end each of lifting plates 168 and 170. FIG. 8B is a detail view of short lifting plate 186. FIG. 8C shows a detail view of a splice plate 180 connecting the left end of lifting plate 166 to a short lifting plate 186. Note that the lifting bar splice plates are optional. FIG. 8D is a typical cross-section for lifting plates 166, 168, 170 and 172. The lifting plate details as shown herein are illustrative only and are not intended to limit the variations of such structures as may be made by persons of ordinary skill based on the teachings presented herein.

Figure 3A:
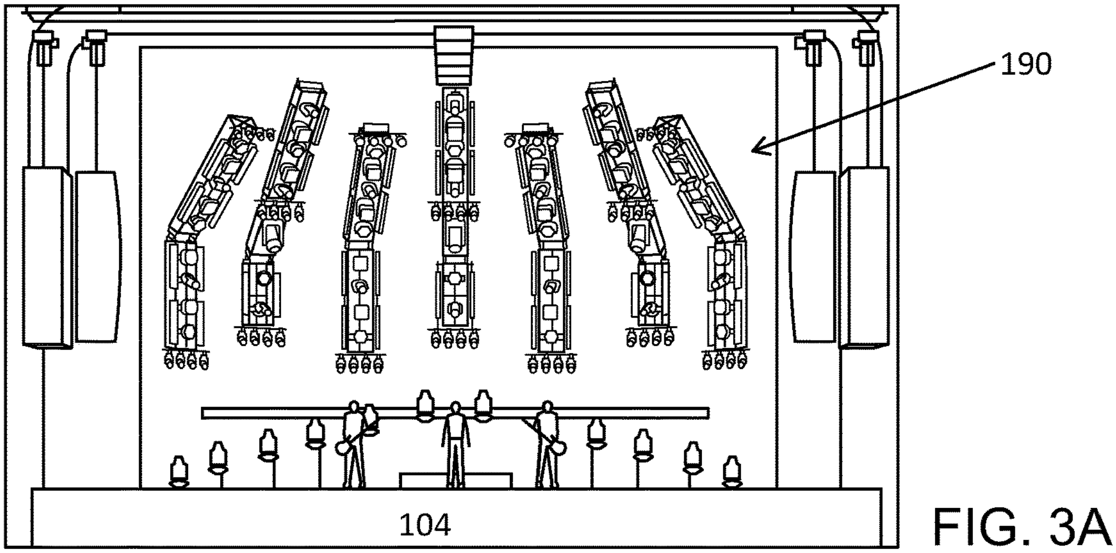

Together, FIGS. 1D, FIGS. 2A-G, FIG. 6, FIGS. 7A-7E and FIGS. 8A-8D, depict an overall system embodiment suited to create the illustrative staging scenes shown in FIGS. 3A-F. A first example of use of the disclosed system, and methods based thereon, is shown in FIG. 4A1-3, wherein schematic details of the staging module arrangement is shown to achieve a "Dome" stage scene 190 as depicted in FIG. 3A. As shown therein, ten (10) of the fixed hoist points (M2-2, M2-3, M2-4, M2-5, M2-6, M3-1, M3-9, M4-1, M4-5 and M4-9) in the overhead hoist grid 102*d*, along with four moveable hoist points (M3-4W, M3-6W, M4-3W and M4-7W) of the overhead hoist grid 102*d* embodiment shown in FIG. 1D are utilized to support seventeen (17) staging modules (three A PODs 118, four B PODs 134, three C PODs 136, four D PODs 140 and three GC PODs 144) in the "Dome" configuration shown. Note that in any specific staging scene created with the system, it is typical that not all fixed hoist points are utilized at the same time, thus in the specific configurations illustrated in detail in FIGS. 4A-E, only the hoist points utilized in that specific configuration are labeled in the drawings. However, the availability of the fixed hoist points for use in a next staging scene is one element that allows for fast staging changes previously not possible.

Another secondary intended effect achievable with the example PODS described above is that when combined, the various fixture types line up in interesting and useful patterns. For example, when the system is hung to create "DOME" stage scene 190, illustrated in FIG. 3A and FIGS. 4A1-3, the GC PODs 144 line up in such a way, that all three spots are on the same visual plane. Also in this configuration—the circular wash lights, and the spot fixtures line up in an interesting and effective zig-zag pattern.

Figure 3B:
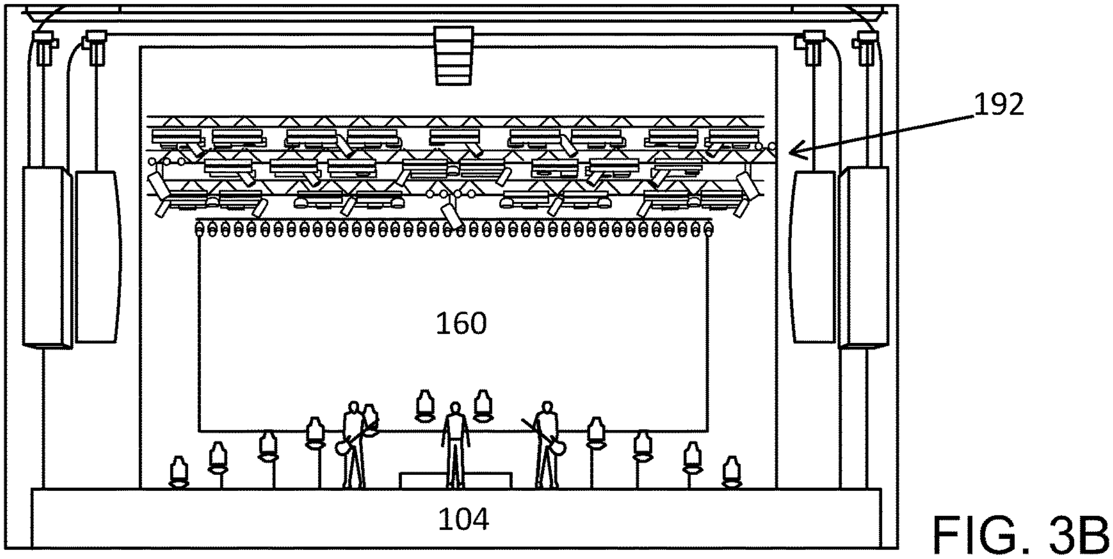
Figure 4B:
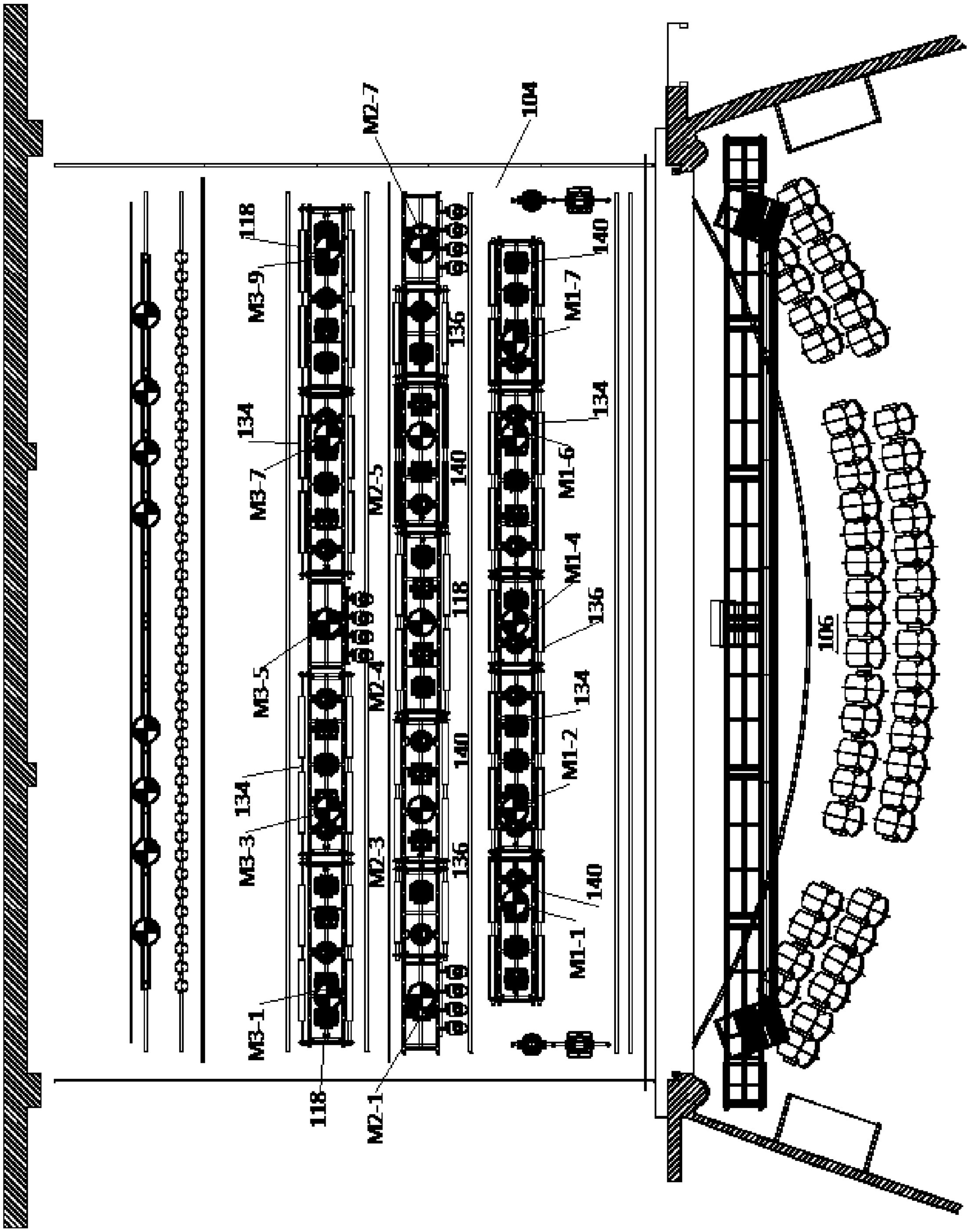
FIG. 4B shows a top view corresponding to the flat staggered scene of FIG. 3B, including a portion of the venue seating.
Figure 5:
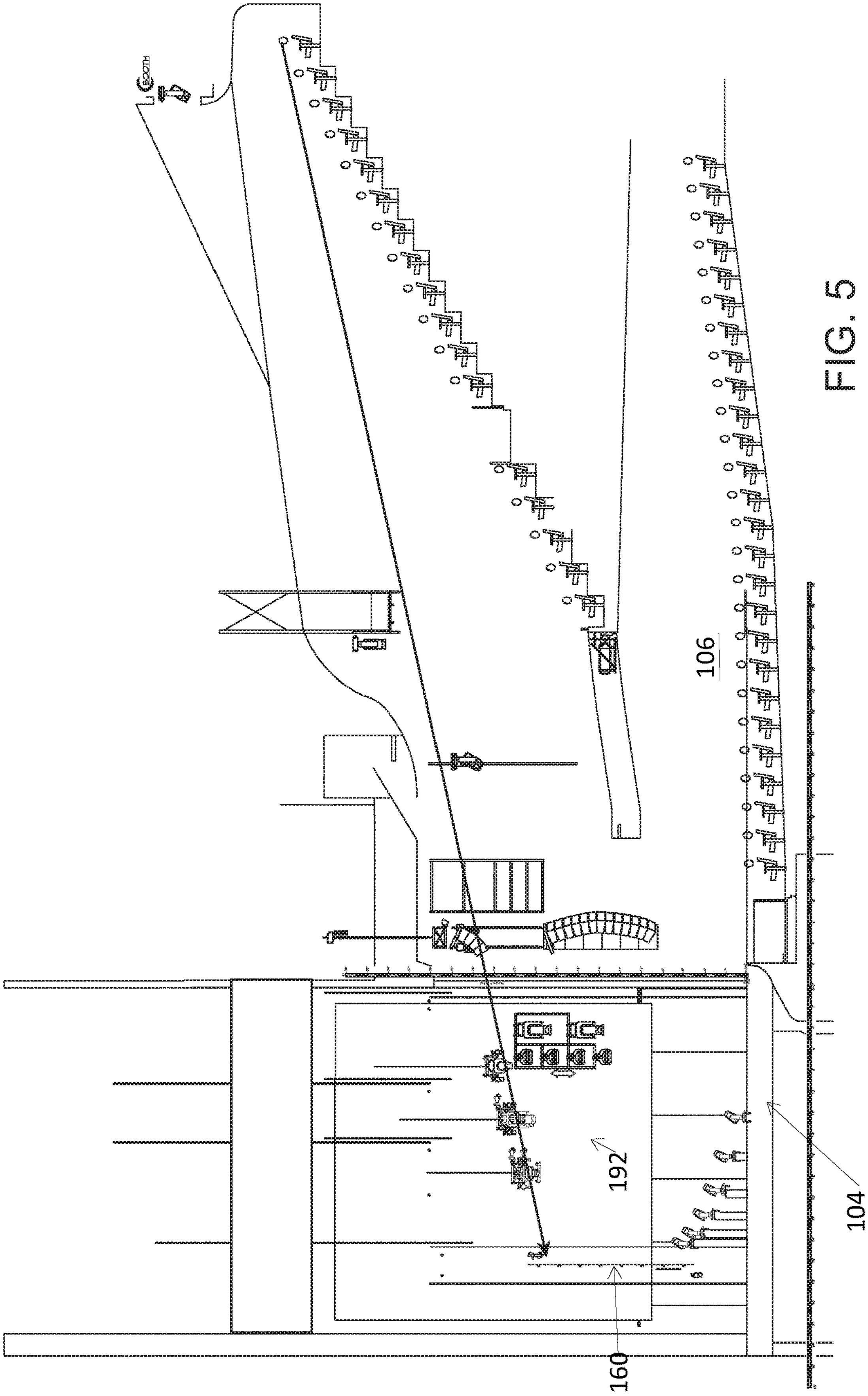
FIG. 5 shows a complete venue cross-section with the stage arranged in the flat staggered scene shown in FIGS. 3B and 4B.

FIG. 4B illustrates in an overhead view, schematic details of a staging module arrangement to achieve the flat staggered scene 192 with a video wall 160 shown in FIG. 3B. As shown therein, twenty (23) selected fixed hoist points in the overhead hoist grid 102*d* are utilized to raise the selected staging modules in the desired configuration. All eight of the fixed hoist points in grid row M5 are used to hoist the video wall staging module as shown in FIG. 6. In this particular scene, no moving hoist points are utilized. FIG. 4B also shows a sound truss mounted in the overhead outside the hoist grid. This staging scene is further illustrated in FIG. 5 showing a full cross-section of the entire hypothetical venue.

Figure 3C:
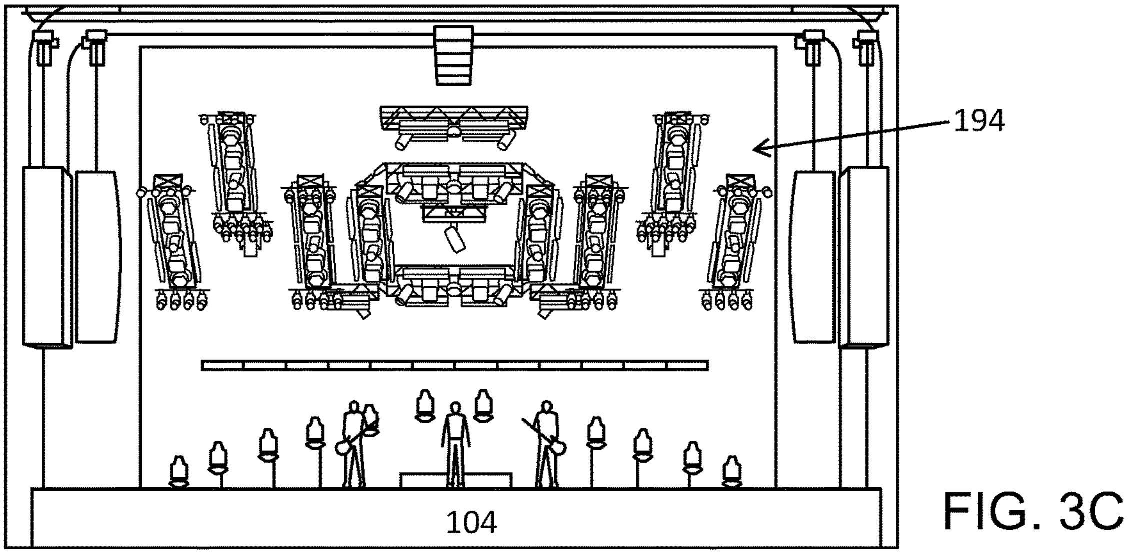

FIGS. 4C1-4C3 illustrate schematic details of a staging module arrangement to achieve the square scene 194 shown in FIG. 3C. In this arrangement, nineteen (19) of the fixed hoist grid points of the FIG. 1D overhead hoist grid are utilized to raise the staging modules in the desired configuration, including six additional movable hoist points. FIG. 3F also shows a square scene 194, including a smaller video wall 160C, which is not used in FIG. 3C. This smaller video wall may be deployed with a video wall staging module as in FIG. 6, supported by two fixed hoist points in hoist grid row M5 as shown in FIG. 4D1-4D3 and described below.

Figure 3D:
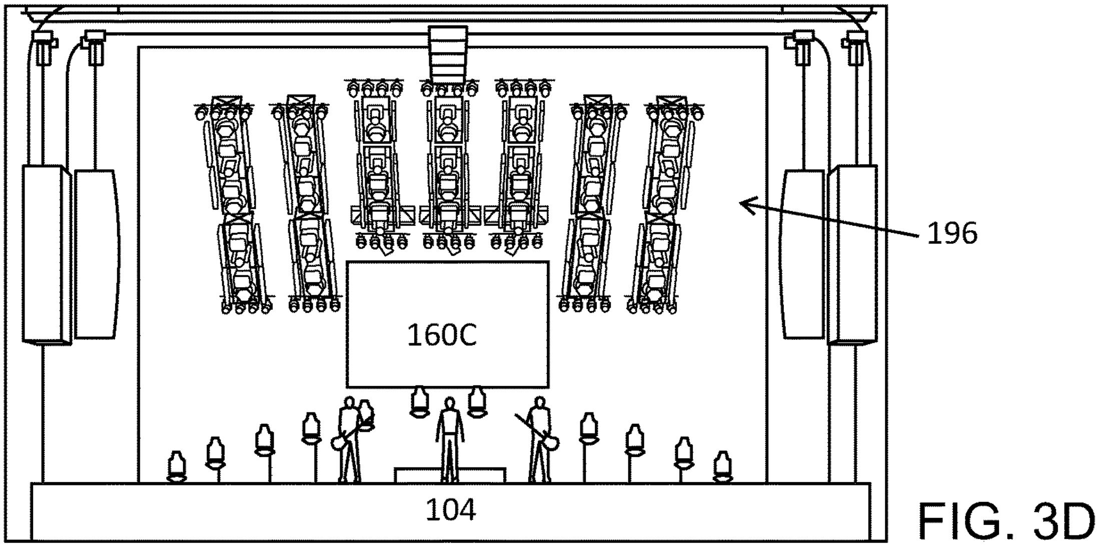

FIGS. 4D1-4D3 illustrate schematic details of a staging module arrangement to achieve another straight scene 196 with a video wall 160C shown in FIG. 3D. In this arrangement, twelve (12) fixed hoist points and six (6) moveable hoist points are used to raise the staging modules. The smaller video wall used in this staging scene utilizes only video wall section C as shown in FIG. 6 and is thus raised with two fixed hoist points M5-4 and M5-5 (114) using medium video module lifting plate 172.

Figure 3E:
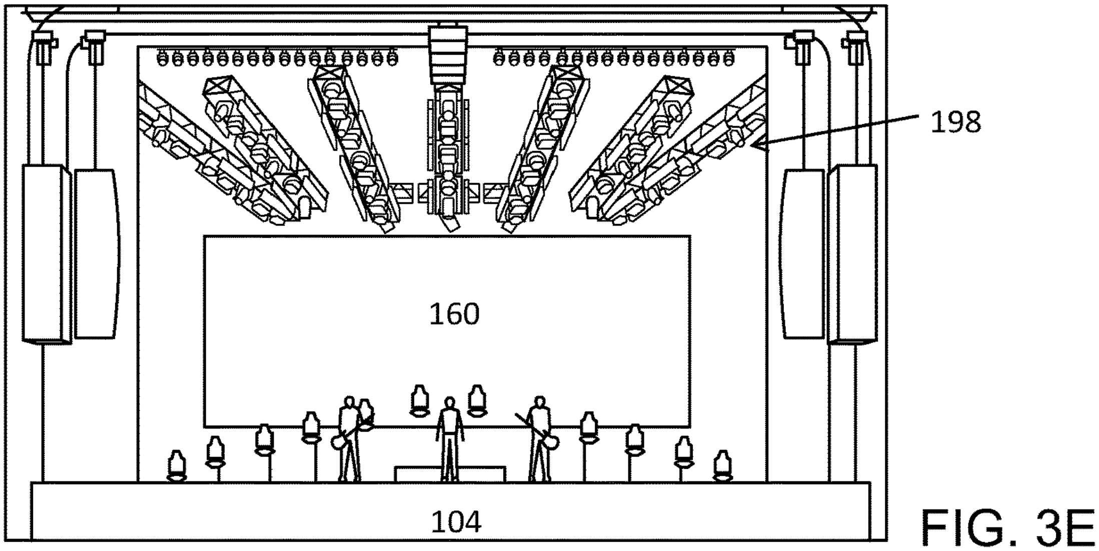
Figure 3F:
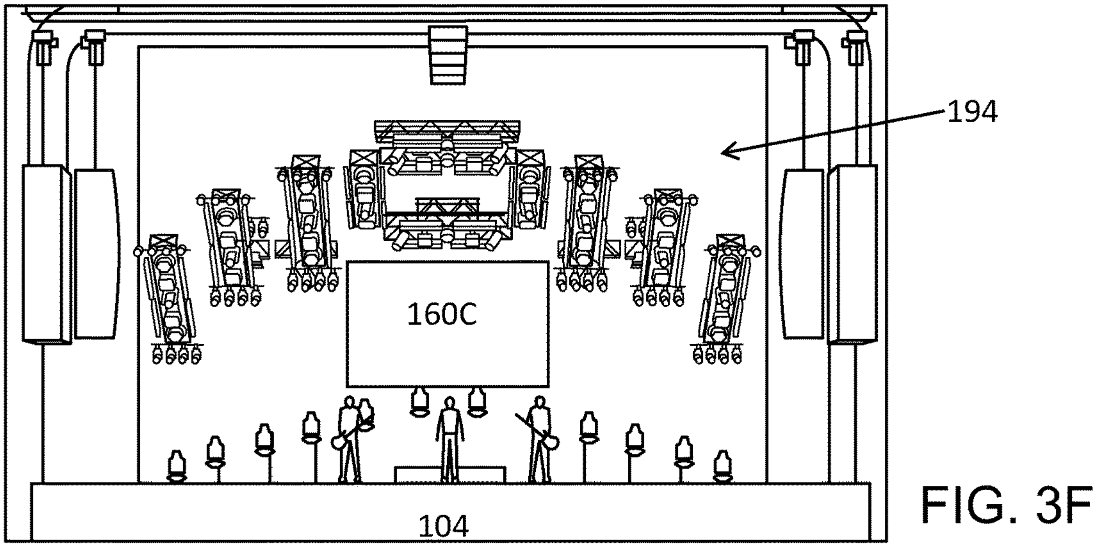

FIGS. 4E1-4E3 illustrate schematic details of a staging module arrangement to achieve the fan scene 198 shown in FIG. 3E. Video wall 160, however is not shown in FIGS. 4E1. The arrangement of video wall 160 as shown in FIG. 3E is substantially as shown in FIG. 6, with the eight fixed hoist point of the M5 row used. In this fan scene staging scene, ten (10) fixed hoist points and six (6) moveable hoist points are used to raise the staging modules other than the video modules.

The various examples described above with reference to FIGS. 3A-F are just a small number of examples of staging scenes that can be created with a system comprising the overhead hoist grid of FIG. 1D, and the staging modules of FIGS. 2A-E, 6, 7A-7E and 8A-8D. Additionally and/or alternatively, additional staging modules with different configurations may be added to the system or alternative overhead hoist grids with more or fewer grid points or alternative spacing may be employed. As will be appreciated by persons of ordinary skill based on the teachings herein, the system is entirely modular and may be added to or subtracted to achieve a vast array of staging scenes without departing from the teachings of the disclosure. Note that a key to the ease of use and rapid staging change capability of the system is the fact that the lighting and other components attached to the individual trusses of each staging module (POD) never need to be changed or repositioned. All that is needed to change staging scenes is lowering and raising the preassembled modules using different combinations of hoist points existing in the overhead hoist grid.

With the systems and methods as disclosed, initial installation to create the first staging scene requires installation of the fixed hoist grid, whether by direct attachment to overhead structures, such as in FIGS. 1A and 1D, or by installation of a hoist grid master truss as in FIG. 1B. Thereafter, staging modules are positioned under each utilized hoist point per the staging plan and hoisted into place. Each "turnover" to a new staging scene starts with lowering the flown elements of the prior staging scene onto their dollies and the moving in the flown elements of the new staging scene their dollies or carts (FIG. 2F) on the stage floor. The dollies are then arranged or re-arranged to a new combination of patterns corresponding to the staging scene to be configured and connected to each other as appropriate for the scene. This new combination is then connected to power and data, and then flown out to a new position over the stage, creating a new look to the lighting system. The process is essentially reversed when the prior staging scene is removed. Dollies are placed under their corresponding staging modules, the modules lowered by the hoist grid on to the dollies and then the modules are disconnected, both lifting disconnection and power and control cable disconnection. The staging modules are then re-arranged as above, with additional staging modules added in or extra staging modules removed as called for in the next stage scene. Using the disclosed system and methods, the time for reconfiguring stages between different acts or performers, which previously could take days, or up to a week, can now be accomplished in a matter of hours. For example, changeover between any of the example staging scenes shown in FIGS. 3A-F using the techniques disclosed herein may be accomplished in 12 hours or less. In most cases, these changeovers can be completed in less than six hours using a skilled crew, whereas using prior art staging techniques even a skilled crew might require a minimum of 24 hours to complete such changeovers. Also, using the disclosed system and methods, performers, venues and other users will not need to take on the responsibility of a costly start up, maintenance, and management of the high cost of touring, but can utilize one of a series of modular building block configurations to create a personalized stage configuration.

The system and methods disclosed provide a flexibility to present a wide range of unique custom staging applications and scenes. Each individual scene can be created, for example, by collaboration of a performer or venue team and a system design team. The flexibility of the disclosed systems and methods arises from its "kit of parts" design, which is thus easily transported to venues, can be easily joined together on-site, and configured to give each individual performer its own design/look, and equally as important, can be re-configured within hours so that changeovers between performers is reduced. In a performance festival setting, for example, depending on staging configurations, it is possible that a first performer using its own custom and unique staging scene, may end on festival day 1, and a second performer opens on festival day 2 with an entirely different custom and unique staging scene—a transition which using conventional staging techniques may have required days to effect. Additionally, systems and methods are saleable, providing flexibility to suit a variety of size venues both large and small by either providing additional modular elements or reducing modular elements.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made to the disclosed embodiments without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for rapid changeover of performance stage staging scenes, comprising:

selecting from an inventory of preconfigured staging modules a first plurality of preconfigured staging modules combinable to create a first staging scene;

selecting from the inventory of preconfigured staging modules a second plurality of preconfigured staging modules combinable to create at least a second staging scene;

selecting from the inventory of preconfigured staging modules at least a third plurality of preconfigured staging modules combinable to create at least a third staging scene;

providing an overhead hoist grid above at least a portion of a stage area, the overhead hoist grid comprising an array of fixed hoist points having lifting elements including power and communication connections;

installing the first staging scene, comprising:

connecting the first plurality of preconfigured staging modules to the lifting elements of a first plurality of selected fixed hoist points in said array of fixed hoist points, said connecting including lifting connections, power connections and communication connections, and lifting the first plurality of preconfigured staging modules using said first plurality of selected fixed hoist points to create said first staging scene; and changing the staging scene and installing the second staging scene, comprising:

lowering preconfigured staging modules previously lifted with the overhead hoist grid onto dollies, disconnecting lowered preconfigured staging modules from lifting elements of the first plurality of selected fixed hoist points;

connecting the second plurality of preconfigured staging modules to the lifting elements of a second plurality of selected fixed hoist points in said array of fixed hoist points, said connecting including lifting connections, power connections and communication connections, and lifting the second plurality of preconfigured staging modules using said second plurality of selected fixed hoist points within the array of fixed hoist points of the overhead hoist grid to create the second or a subsequent staging scene; and changing the staging scene and installing the third or a subsequent staging scene, comprising:

lowering preconfigured staging modules previously lifted with the overhead hoist grid onto dollies, disconnecting lowered preconfigured staging modules from lifting elements of the second or a subsequent plurality of selected fixed hoist points;

connecting the third plurality of preconfigured staging modules to the lifting elements of a third or subsequent plurality of selected fixed hoist points in said array of fixed hoist points, said connecting including lifting connections, power connections and communication connections, and lifting the third or a subsequent plurality of preconfigured staging modules using the third or subsequent plurality of selected fixed hoist points to create the third or a subsequent staging scene;

wherein at least one of the first, second or third plurality of selected fixed hoist points comprises (i) a unique set selected of hoist points, and (ii) utilizes less than all fixed hoist points in the array of fixed hoist points.

2. The method of claim 1, wherein the changing and installing a new staging scene is performed in less than 12 clock hours.

3. The method of claim 1, further comprising augmenting the fixed hoist grid with at least one moveably positionable hoist point.

4. A modular staging system permitting rapid changeovers between staging scenes, comprising:

an overhead grid of fixed hoist points made up of an array of hoists having flexible lifting elements including power and communication connections; and a plurality of preconfigured staging modules of different types liftable by the lifting elements of selected hoist points of the overhead fixed hoist grid, wherein:

each different staging module type provides a different staging function or design effect, said preconfigured staging modules include a plurality of different stage lighting modules and at least one modular video wall module, and said video wall module comprises plural video tiles configured to form video walls of varying sizes, and a modular video tile lifting plate to support said video tiles and connect to the lifting elements of said hoists.

5. The modular staging system of claim 4, wherein said plurality of preconfigured staging modules comprise an inventory of preconfigured staging modules, said inventory comprising one or more of each different preconfigured staging module type.

6. The modular staging system of claim 5, wherein said inventory of preconfigured staging modules comprises staging modules sufficient to create at least three unique stage lighting scenes.

7. The modular staging system of claim 6, wherein said inventory of preconfigured staging modules comprises staging modules sufficient to create at least five unique stage lighting scenes.

8. The modular staging system of claim 5, wherein said inventory comprises one or more of at least three of the following staging module types:

a large spotlight module comprising at least two spotlight fixtures and at least two wash light fixtures;

a large wash light module comprising at least four wash light fixtures;

a small spot/wash light module comprising at least one spotlight fixture and at least one wash light fixture;

a medium wash light module comprising at least three wash light fixtures; and a ground controlled spotlight module comprising a ground controlled spotlight fixture.

9. The modular staging system of claim 4, wherein said stage lighting modules comprise one or more stage lighting fixtures mounted on a truss.

10. The modular staging system of claim 9, wherein said stage lighting modules further comprise a buss box mounted on the truss and connected to lighting fixtures on the truss to deliver power and control instructions to said lighting fixtures, the buss box being configured to be connected to the flexible lifting element power and communication connections.

11. The modular staging system of claim 10, wherein said fixed hoist points comprise connections for power and communication, and wherein said system further comprises at least one control module configured to control power and operation of connected lighting fixtures, said at least one control module communicating with the lighting fixtures through said power and communication connections on the fixed hoist points and through said flexible lifting elements.

* * * * *